(12) United States Patent
Pan et al.

(10) Patent No.: US 8,676,197 B2
(45) Date of Patent: Mar. 18, 2014

(54) SYSTEM, METHOD, AND DEVICE TO CONTROL WIRELESS COMMUNICATIONS

(75) Inventors: Shaowei Pan, Kildeer, IL (US); Nicholas Labun, Chicago, IL (US)

(73) Assignee: Lemko Corporation, Itasca, IL (US)

( * ) Notice: Subject to any disclaimer, the term of this patent is extended or adjusted under 35 U.S.C. 154(b) by 1126 days.

(21) Appl. No.: 11/955,017

(22) Filed: Dec. 12, 2007

(65) Prior Publication Data
US 2008/0146158 A1 Jun. 19, 2008

Related U.S. Application Data

(60) Provisional application No. 60/869,890, filed on Dec. 13, 2006.

(51) Int. Cl.
*H04W 4/00* (2009.01)
*H04W 36/00* (2009.01)
*F23Q 7/02* (2006.01)
*F42C 15/44* (2006.01)

(52) U.S. Cl.
USPC ........ 455/435.1; 455/443; 455/444; 102/206; 102/426

(58) Field of Classification Search
USPC ................. 455/418–422.1, 443–444, 435.1
See application file for complete search history.

(56) References Cited

U.S. PATENT DOCUMENTS

| | | |
|---|---|---|
| 4,284,848 A | 8/1981 | Frost |
| 5,590,175 A | 12/1996 | Gallant et al. |
| 5,623,495 A | 4/1997 | Eng et al. |
| 5,734,979 A | 3/1998 | Lu et al. |
| 5,933,784 A | 8/1999 | Gallagher et al. |
| 5,991,639 A | 11/1999 | Rautiola et al. |
| 6,122,499 A | 9/2000 | Magnusson |
| 6,131,038 A | 10/2000 | Sekine et al. |
| 6,141,564 A | 10/2000 | Bruner et al. |
| 6,160,804 A | 12/2000 | Ahmed et al. |

(Continued)

FOREIGN PATENT DOCUMENTS

| | | |
|---|---|---|
| CN | 1538781 A | 10/2004 |
| CN | 101044769 A | 9/2007 |

(Continued)

OTHER PUBLICATIONS

International Search Report and Written Opinion received for corresponding International Application No. PCT/US07/25538 from the International Searching Authority (ISA/US) mailed Sep. 22, 2008, 8 pages.

(Continued)

*Primary Examiner* — Huy C Ho
(74) *Attorney, Agent, or Firm* — Toler Law Group, PC

(57) ABSTRACT

Methods and systems for controlling wireless communications are provided. A method of controlling wireless communications includes acquiring base station data at a mobile base station mimicking system. The base station data is associated with a targeted base station of a wireless communication system. The method may include mimicking signals of a neighboring base station of the targeted base station based on the acquired base station data. Further, the method may include transmitting a ban signal associated with the targeted base station. The ban signal is based on the acquired base station data and may induce at least one communication device to stop communicating with the targeted base station. In addition, the method includes controlling communications associated with the at least one communication device via the mobile base station mimicking system.

25 Claims, 28 Drawing Sheets

(56) References Cited

U.S. PATENT DOCUMENTS

| | | |
|---|---|---|
| 6,411,825 B1 | 6/2002 | Csapo et al. |
| 6,418,308 B1 | 7/2002 | Heinonen et al. |
| 6,421,325 B1 | 7/2002 | Kikinis |
| 6,515,985 B2 | 2/2003 | Shmulevich et al. |
| 6,539,237 B1 | 3/2003 | Sayers et al. |
| 6,542,497 B1 | 4/2003 | Curry et al. |
| 6,584,098 B1 | 6/2003 | Dutnall |
| 6,611,533 B1 | 8/2003 | Liao et al. |
| 6,614,784 B1 | 9/2003 | Glitho et al. |
| 6,647,426 B2 | 11/2003 | Mohammed |
| 6,678,155 B1 | 1/2004 | Bresniker |
| 6,694,134 B1 | 2/2004 | Lu et al. |
| 6,697,355 B1 | 2/2004 | Lim |
| 6,704,409 B1 | 3/2004 | Dilip et al. |
| 6,731,932 B1 | 5/2004 | Rune et al. |
| 6,735,184 B1 | 5/2004 | Davidson et al. |
| 6,751,207 B1 | 6/2004 | Lee |
| 6,760,325 B1 | 7/2004 | Hameleers |
| 6,763,226 B1 | 7/2004 | McZeal, Jr. |
| 6,763,233 B2 | 7/2004 | Bharatia |
| 6,791,988 B1 | 9/2004 | Hameleers et al. |
| 6,795,444 B1 | 9/2004 | Vo et al. |
| 6,807,431 B2 | 10/2004 | Sayers et al. |
| 6,807,432 B2 | 10/2004 | Hwang |
| 6,816,706 B1 | 11/2004 | Hohnstein et al. |
| 6,819,652 B1 | 11/2004 | Ahktar et al. |
| 6,829,473 B2 | 12/2004 | Raman et al. |
| 6,831,903 B2 | 12/2004 | Kang |
| 6,839,356 B2 | 1/2005 | Barany et al. |
| 6,859,652 B2 | 2/2005 | Karabinis et al. |
| 6,871,072 B1 | 3/2005 | Meche |
| 6,879,582 B1 | 4/2005 | Dhara et al. |
| 6,879,677 B2 | 4/2005 | Trandal et al. |
| 6,917,813 B2 | 7/2005 | Elizondo |
| 6,937,708 B2 | 8/2005 | Hirose |
| 6,958,983 B2 | 10/2005 | Musikka et al. |
| 6,985,454 B1 | 1/2006 | Wiedeman et al. |
| 7,003,286 B2 | 2/2006 | Brown et al. |
| 7,050,414 B2 | 5/2006 | Lin |
| 7,054,307 B2 | 5/2006 | Papadimitriou et al. |
| 7,054,322 B2 | 5/2006 | D'Annunzio et al. |
| 7,072,650 B2 | 7/2006 | Stanforth |
| 7,117,015 B2 | 10/2006 | Scheinert et al. |
| 7,120,435 B2 | 10/2006 | Usher et al. |
| 7,120,436 B2 * | 10/2006 | Kim ............... 455/433 |
| 7,133,670 B1 | 11/2006 | Moll et al. |
| 7,133,923 B2 | 11/2006 | MeLampy et al. |
| 7,136,651 B2 | 11/2006 | Kalavade |
| 7,154,901 B2 | 12/2006 | Chava et al. |
| 7,158,621 B2 | 1/2007 | Bayne |
| 7,171,216 B1 * | 1/2007 | Choksi ............... 455/456.1 |
| 7,299,039 B2 | 11/2007 | Lee et al. |
| 7,313,399 B2 | 12/2007 | Rhee et al. |
| 7,324,478 B2 | 1/2008 | Park et al. |
| 7,328,268 B1 | 2/2008 | Foltak et al. |
| 7,346,334 B2 * | 3/2008 | Gaeta et al. ............... 455/404.1 |
| 7,349,412 B1 | 3/2008 | Jones et al. |
| 7,359,700 B2 | 4/2008 | Swensen et al. |
| 7,383,042 B2 | 6/2008 | Lamb et al. |
| 7,385,947 B2 | 6/2008 | Wu et al. |
| 7,406,069 B2 | 7/2008 | Yashar et al. |
| 7,424,313 B2 | 9/2008 | Ham et al. |
| 7,486,967 B2 | 2/2009 | Pan et al. |
| 7,536,170 B2 * | 5/2009 | Goldman et al. ............ 455/404.1 |
| 7,539,158 B2 | 5/2009 | Pan |
| 7,548,763 B2 | 6/2009 | Pan |
| 7,552,670 B2 * | 6/2009 | Goldman et al. ............... 89/1.13 |
| 7,606,594 B2 | 10/2009 | Jesse et al. |
| 7,653,414 B2 | 1/2010 | Pan |
| 7,738,488 B2 | 6/2010 | Marisco et al. |
| 7,760,695 B2 | 7/2010 | Gopalakrishnan et al. |
| 7,787,879 B1 | 8/2010 | Philips et al. |
| 7,840,230 B2 | 11/2010 | Pan |
| 7,855,988 B2 | 12/2010 | Pan |
| 7,856,233 B2 | 12/2010 | Pan |
| 7,979,066 B2 | 7/2011 | Pan |
| 8,036,158 B2 | 10/2011 | Pan et al. |
| 8,046,420 B2 | 10/2011 | Pan |
| 8,089,920 B2 | 1/2012 | Pan |
| 8,107,409 B2 | 1/2012 | Pan |
| 8,224,322 B2 | 7/2012 | Pan |
| 8,310,990 B2 | 11/2012 | Pan |
| 8,359,029 B2 | 1/2013 | Pan |
| 2001/0036173 A1 | 11/2001 | Shmulevich et al. |
| 2001/0046859 A1 | 11/2001 | Kil |
| 2001/0055298 A1 | 12/2001 | Baker et al. |
| 2002/0009060 A1 | 1/2002 | Gross |
| 2002/0015392 A1 | 2/2002 | Musikka et al. |
| 2002/0016180 A1 * | 2/2002 | Derosier et al. ............... 455/522 |
| 2002/0045444 A1 | 4/2002 | Usher et al. |
| 2002/0051518 A1 | 5/2002 | Bondy et al. |
| 2002/0058502 A1 | 5/2002 | Stanforth |
| 2002/0061746 A1 | 5/2002 | Jo et al. |
| 2002/0160772 A1 | 10/2002 | Gailey et al. |
| 2002/0169887 A1 | 11/2002 | MeLampy et al. |
| 2003/0048766 A1 | 3/2003 | D'Annunzio et al. |
| 2003/0063721 A1 | 4/2003 | Hirose |
| 2003/0088698 A1 | 5/2003 | Singh et al. |
| 2003/0092441 A1 | 5/2003 | Taha et al. |
| 2003/0096628 A1 | 5/2003 | Bar-On et al. |
| 2003/0100302 A1 | 5/2003 | Armbruster et al. |
| 2003/0100342 A1 | 5/2003 | Ham et al. |
| 2003/0112748 A1 | 6/2003 | Puppa et al. |
| 2003/0153343 A1 | 8/2003 | Crockett et al. |
| 2003/0186694 A1 | 10/2003 | Sayers et al. |
| 2003/0198325 A1 | 10/2003 | Bayne |
| 2004/0014466 A1 | 1/2004 | Jesse et al. |
| 2004/0018829 A1 | 1/2004 | Raman et al. |
| 2004/0019539 A1 | 1/2004 | Raman et al. |
| 2004/0156495 A1 | 8/2004 | Chava et al. |
| 2004/0203621 A1 | 10/2004 | Brown et al. |
| 2004/0203677 A1 | 10/2004 | Brown et al. |
| 2004/0204097 A1 | 10/2004 | Scheinert et al. |
| 2004/0253949 A1 | 12/2004 | Swensen et al. |
| 2004/0253984 A1 | 12/2004 | Csapo et al. |
| 2004/0259556 A1 | 12/2004 | Czys |
| 2005/0064922 A1 * | 3/2005 | Owens et al. ............... 455/575.5 |
| 2005/0070278 A1 | 3/2005 | Jiang |
| 2005/0075106 A1 | 4/2005 | Jiang |
| 2005/0091392 A1 | 4/2005 | Gesswein et al. |
| 2005/0176413 A1 | 8/2005 | Lee et al. |
| 2005/0250491 A1 | 11/2005 | Roy et al. |
| 2006/0046714 A1 | 3/2006 | Kalavade |
| 2006/0046760 A1 | 3/2006 | Bertino et al. |
| 2006/0047836 A1 | 3/2006 | Rao et al. |
| 2006/0052113 A1 | 3/2006 | Ophir et al. |
| 2006/0063544 A1 | 3/2006 | Zhao et al. |
| 2006/0098661 A1 | 5/2006 | Pan |
| 2006/0114934 A1 | 6/2006 | Shin et al. |
| 2006/0141984 A1 | 6/2006 | Taglienti et al. |
| 2006/0142011 A1 | 6/2006 | Kallio |
| 2006/0148465 A1 * | 7/2006 | Perdomo et al. ............ 455/422.1 |
| 2006/0159039 A1 | 7/2006 | Jung et al. |
| 2006/0203746 A1 | 9/2006 | Maggenti et al. |
| 2006/0217121 A1 * | 9/2006 | Soliman et al. ............... 455/446 |
| 2006/0221912 A1 | 10/2006 | Olivier et al. |
| 2006/0234747 A1 | 10/2006 | Pan |
| 2006/0234774 A1 | 10/2006 | Pan et al. |
| 2006/0258358 A1 | 11/2006 | Kallio |
| 2007/0008968 A1 | 1/2007 | Baker et al. |
| 2007/0010245 A1 | 1/2007 | Levitan |
| 2007/0021097 A1 * | 1/2007 | Gaeta et al. ............... 455/404.1 |
| 2007/0021118 A1 | 1/2007 | Ophir |
| 2007/0060124 A1 | 3/2007 | Kalavade |
| 2007/0076697 A1 | 4/2007 | Huotari et al. |
| 2007/0087738 A1 | 4/2007 | Melkesetian |
| 2007/0147598 A1 | 6/2007 | Somes et al. |
| 2007/0202847 A1 | 8/2007 | Pan |
| 2007/0213075 A1 | 9/2007 | Jiang |
| 2007/0230352 A1 | 10/2007 | Kokku et al. |
| 2007/0232267 A1 | 10/2007 | Pan |
| 2007/0232304 A1 * | 10/2007 | Goldman et al. ............ 455/435.1 |
| 2007/0234892 A1 * | 10/2007 | Goldman et al. ............... 89/1.13 |
| 2007/0243891 A1 | 10/2007 | Civanlar et al. |

(56) References Cited

U.S. PATENT DOCUMENTS

| | | |
|---|---|---|
| 2007/0271606 A1 | 11/2007 | Amann et al. |
| 2007/0287452 A1 | 12/2007 | Pan |
| 2007/0291910 A1 | 12/2007 | Bucchieri et al. |
| 2008/0039144 A1 | 2/2008 | Pan et al. |
| 2008/0080438 A1 | 4/2008 | Gopalakrishnan et al. |
| 2008/0101314 A1 | 5/2008 | Bachmutsky |
| 2008/0101410 A1 | 5/2008 | Barkley et al. |
| 2008/0146158 A1 | 6/2008 | Pan et al. |
| 2008/0168523 A1 | 7/2008 | Ansari et al. |
| 2009/0003269 A1 | 1/2009 | Kumazawa et al. |
| 2009/0022155 A1 | 1/2009 | Rosenberg et al. |
| 2009/0067441 A1 | 3/2009 | Ansari et al. |
| 2009/0186626 A1 | 7/2009 | Raghothaman |
| 2009/0215449 A1 | 8/2009 | Avner |
| 2009/0227230 A1 | 9/2009 | Camilleri et al. |
| 2009/0227235 A1 | 9/2009 | Pan |
| 2009/0271491 A1 | 10/2009 | Pan |
| 2009/0325584 A1 | 12/2009 | Pan |
| 2009/0327819 A1 | 12/2009 | Pan |
| 2010/0008306 A1 | 1/2010 | Pan |
| 2010/0008369 A1 | 1/2010 | Pan |
| 2010/0048197 A1 | 2/2010 | Jiang |
| 2010/0048208 A9 | 2/2010 | Gunaratnam et al. |
| 2010/0057485 A1 | 3/2010 | Luft |
| 2010/0075668 A1 | 3/2010 | Pan |
| 2010/0080214 A1 | 4/2010 | Li et al. |
| 2010/0094878 A1 | 4/2010 | Soroca et al. |
| 2010/0217837 A1 | 8/2010 | Ansari et al. |
| 2011/0059740 A1 | 3/2011 | Pan |
| 2011/0060853 A1 | 3/2011 | Pan |
| 2011/0223921 A1 | 9/2011 | Pan et al. |
| 2012/0002607 A1 | 1/2012 | Pan |
| 2012/0094659 A1 | 4/2012 | Pan |
| 2012/0106454 A1 | 5/2012 | Pan |
| 2013/0039279 A1 | 2/2013 | Pan |
| 2013/0065583 A1 | 3/2013 | Pan |
| 2013/0130677 A1 | 5/2013 | Pan |
| 2013/0148578 A1 | 6/2013 | Pan |

FOREIGN PATENT DOCUMENTS

| | | |
|---|---|---|
| EP | 0365885 | 5/1990 |
| GB | 2435751 B | 2/2009 |
| WO | 2006052342 A2 | 5/2006 |
| WO | 2007102003 A1 | 9/2007 |
| WO | 2008150281 A1 | 12/2008 |
| WO | 2009158154 A2 | 12/2009 |
| WO | 2009158155 A2 | 12/2009 |
| WO | 2010005648 A2 | 1/2010 |
| WO | 2010008695 A2 | 1/2010 |
| WO | 2010036439 A2 | 4/2010 |

OTHER PUBLICATIONS

Hoffpauir et al., United States Statutory Invention Registration No. H1,918; Entitled "Integrated Authentication Center and Method for Authentication in a Wireless Telecommunications Network"; Filed Feb. 19, 1998; Published Nov. 7, 2000; 19 Pages.

Pan, U.S. Appl. No. 13/309,003; "Providing Communications Using a Distributed Mobile Architecture"; Filed Dec. 20, 2011.

B.G. Evans and K. Baughan; "Visions of 4G"; Electronics & Communication Engineering Journal; Dec. 2000; pp. 293-303.

Shirshanka Das, Alok Nandan & Giovanni Pau (University of CA, Los Angeles, CA, USA); "SPAWN: A Swarming Protocol for Vehicular Ad-Hoc Wireless Networks"; VANET'04, Oct. 1, 2004, Philadelphia, PA, USA; ACM 1-58113-922-5/04/0010; 2 pgs.

Yu-Chee Tseng, Chia-Ching Shen (National Chiao Tung University) & Wen-Tsuen Chen (National Tsing Hua University); "Integrating Mobile IP with AD Hoc Networks"; IEEE Computer Society; 0018-9162/03; 2003 IEEE; May 2003; pp. 48-55.

Halim Yanikomeroglu, David D. Falconer & Van M. Sreng; "Coverage Enhancement Through Two-Hop Peer-to-Peer Relaying in Cellular Radio Networks"; Broadband Communications and Wireless Systems (BCWS) Centre Department of Systems & Computer Engineering, Carleton University, Ottawa, Canada; WWRF Meeting #7, Eindhoven, the Netherlands, Dec. 3-4, 2002, WG4: Spectrum, New Air Interfaces and Ad-Hoc Networking Multi-Hop Wireless Systems; 10 pages.

Bur Goode; "Voice Over Internet Protocol (VoIP)"; 0018-9219/02 2002 IEEE; Proceedings of the IEEE; vol. 90, No. 9, Sep. 2002; pp. 1495-1517.

Kyung-Hyu Lee, Kyu-Ok Lee & Kwon-Chul Park (Network Research Laboratory ETRI Korea) Jong-Ok Lee and Yoon-Hak Bang (Network Planning Team KT Korea); "Architecture to be Deployed on Strategies of Next-Generation Networks"; 0-7803-7802-4/03 2003 IEEE; pp. 819-822.

Wolfgang Kellerer, Christian Bettstetter, Christian Schwingenschlögl & Peter Sties (Technische Universität München) Karl-Ernst Steinberg (BMW) & Hans-Jörg Vögel (the Fantastic Corp); "(Auto) Mobile Communication in a Heterogeneous and Converged World"; IEEE Personal Communications; Dec. 2001; 1070-9916/01; 2001 IEEE pp. 41-47.

Nilanjan Banerjee & Sajal K. Das (University of Texas, Arlington) & Arup Acharya (IBM T.J. Watson Research Center) "Peer-to-peer SIP-based Services over Wireless Ad Hoc Networks"; BROADWIM: Broadband Wireless Multimedia Workshop; Oct. 29, 2004—broadnets.org; *This work was supported by NSF under the ORBIT testbed project, grant # NSF NRT Project #ANI-0335244 and by NSF ITR grant IIS-0326505; 8 pages.

Hung-Yu Wei (Columbia University) & Richard D. Gitlin (NEC Laboratories America); "Two-Hop-Relay Architecture for Next-Generation WWAN/WLAN Integration"; 4G Mobile Communications: Toward Open Wireless Architecture; 1536-1284/04 2004 IEEE; IEEE Wireless Communications; Apr. 2004; pp. 2-9.

Wolfgang Kellerer (LKN, Munich University of Technology), Hans-Jörg Vögel (the Fantastic Corp.) & Karl-Ernst Steinberg (BMW); "A Communication Gateway for Infrastructure Independent Wireless Access"; IEEE Communications Magazine; Mar. 2002; vol. 9; No. 3; 6 pages.

Willie W. Lu & Jenny Hu (U.S. Center for Wireless Communications, Stanford University, CA); "Open Wireless Architecture—The Core to 4G Mobile Communications"; China Communications; Apr. 2006; pp. 32-39.

Ralf Pabst, Bernard H. Walke & Daniel C. Schultz (RWTH Aachen University) Patrick Herhold & Gerhard P. Fettweis (Technical University of Dresden) Halim Yanikomeroglu & David D. Falconer (Carleton University) Sayandev Mukherjee & Harish Viswanathan (Lucent Technologies) Matthias Lott & Wolfgang Zirwas (Siemens ICM) Mischa Dohler & Hamid Aghvami (Kings College); "Relay-Based Deployment Concepts for Wireless and Mobile Broadband Radio"; 0163-6804/04; 2004 IEEE; IEEE Communications Magazine; Sep. 2004; pp. 80-89.

Simone Frattasi, Hanane Fathi, Frank H.P. Fitzek & Ramjee Prasad (Aalborg University) Marcos D. Katz (Samsung Electronics); "Defining 4G Technology from the User's Perspective"; IEEE Network; Jan./Feb. 2006; 0890-8044/06; 2006 IEEE; pp. 35-41.

Ian F. Akyildiz (Broadband and Wireless Networking BWN Lab, Georgia Institute of Technology) Xudong Wang & Weilin Wang (Kiyon, Inc. La Jolla, CA); "Wireless Mesh Networks: A Survey"; Computer Networks 47; Jan. 1, 2005; pp. 445-487; 1389-1286 2004 Elsevier B.V.

Brian Woerner (Virginia Tech, Blacksburg, VA) & Mostofa Howlader (University of Tennessee, Knoxville, TN); "Research Directions for Fourth Generation Wireless"; Proceedings of the 10th IEEE International Workshops on Enabling Technologies: Infrastructure for Collaborative Enterprises (WETICE 2001); Jun. 20-22, 2001; Cambridge, MA, USA; IEEE Computer Society 2001; ISBN 0-7695-1269-0; 2 pages.

(56) References Cited

OTHER PUBLICATIONS

"Framework and Overall Objectives of the Future Development of IMT-2000 and Systems Beyond IMT-2000"; International Telecommunication Union; ITU-R Radiocommunication Sector of ITU; Recommendation ITU-R M.1645 (Jun. 2003); M Series; Mobile, Radiodetermination, Amateur and Related Satellite Services; 26 pages.

Yu, W. et al., "Reverse Link Capacity Analysis on Distributed Wireless Communication System", Journal of Beijing University of Posts and Telecommunications, Jun. 30, 2004, 4 pages.

* cited by examiner

_US 8,676,197 B2_

SYSTEM, METHOD, AND DEVICE TO CONTROL WIRELESS COMMUNICATIONS

CLAIM OF PRIORITY

This application claims priority from U.S. Provisional Patent Application No. 60/869,890, filed on Dec. 13, 2006, which is incorporated herein by reference in its entirety.

FIELD OF THE DISCLOSURE

The present disclosure relates generally to controlling wireless communications.

BACKGROUND

Improvised explosive devices (IEDs) have caused many deaths in certain regions of the world. IEDs may be made using commercially available supplies. For example, some IEDs may use a mobile communications device, such as a cellular telephone or pager, as a triggering device. The mobile communications device may be connected to a detonator of the IED. Upon receiving a particular signal, such as an incoming call signal, the mobile communications device may cause the detonation of the IED.

Jamming mobile communications of mobile communication devices used in IEDs may be difficult and expensive for multi-channel commercial wireless systems, such as Global System for Mobile Communication (GSM) and Code Division Multiple Access (CDMA) systems. Accordingly, there exists a need for an improved method and system of controlling wireless communications.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

A system to control wireless communications is disclosed. The system includes a mobile base station mimicking system adapted to create a movable communication control region by inducing at least one communication device within the movable communication control region to communicate via the mobile base station mimicking system. The at least one communication device is adapted to communicate via a base station before being induced to communicate via the mobile base station mimicking system. The system also includes a directional antenna coupled to the mobile base station mimicking system.

In another embodiment, a method of controlling wireless communications is disclosed. The method includes acquiring first base station data at a mobile base station mimicking system. The first base station data is associated with a first base station of a wireless communication system. The method also includes mimicking signals of the first base station based on the acquired first base station data. In addition, the method includes controlling communications associated with at least one communication device via the mobile base station mimicking system.

In another embodiment, a method of controlling wireless communications is disclosed that includes inducing a mobile communication device to register with a communication control system. The mobile communication device functions as a triggering mechanism of a particular remotely controlled explosive device. The method also includes blocking a first detonation triggering signal directed to the mobile communication device.

Figure 1:
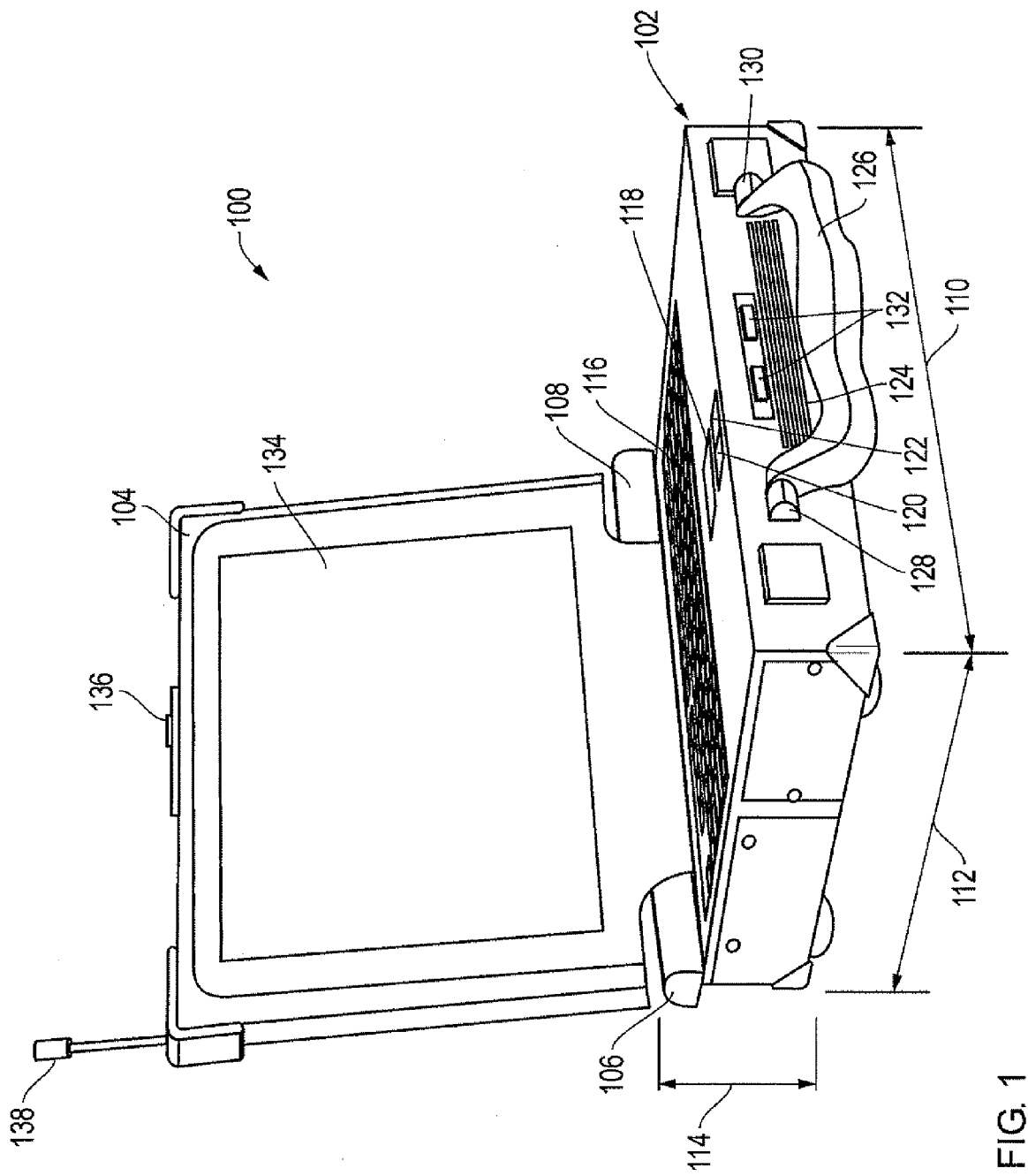
FIG. 1 is a view of a distributed mobile architecture server having a first illustrative form factor.

Referring to FIG. 1, a distributed mobile architecture (DMA) server is shown and is generally designated 100. As illustrated in FIG. 1, the DMA server 100 includes a base 102 and a lid 104. As shown, the lid 104 is attached to the base by a first lid hinge 106 and a second lid hinge 108. In a particular embodiment, the lid 104 can be rotated about the first lid hinge 106 and the second lid hinge 108 between an open position, shown in FIG. 1, and a closed position (not shown) in which the lid 104 overlays the base 102 and the DMA server 100 is essentially shaped like a box or a briefcase.

As indicated in FIG. 1, the base 102 has a length 110, a width 112, and a height 114. FIG. 1 shows that the DMA server 100 includes a keyboard input device 116 that is incorporated in an upper surface of the base 102. Further, the DMA server 100 includes a mouse input device 118 that is also incorporated into the upper surface of the base 102. In a particular embodiment, the mouse input device 118 is a touch mouse input device 118. Additionally, the DMA server 100 includes a left side button 120 and a right side button 122. In a particular embodiment, the left side button 120 can be used to perform left-click functionality associated with the mouse input device 118. Moreover, the right side button 122 can be used to perform right-click functionality associated with the mouse input device 118.

FIG. 1 further indicates that the base 102 of the DMA server 100 is formed with a vent 124 to permit air exchange with the interior of the base 102 of the DMA server 100 and to facilitate cooling of the electronic components of the DMA server 100 housed within the base 102. Moreover, the base 102 of the DMA server 100 includes a handle 126 that is attached to the base 102 via a first handle hinge 128 and a second handle hinge 130. The base 102 also includes a pair of latch engagement notches 132.

As shown in FIG. 1, the lid 104 includes a flat panel display 134 incorporated therein. When the lid 104 is closed, the display 134 is adjacent to the keyboard 116. Moreover, when the lid 104 is closed, the lid 104 and the base 102 cooperate to protect the display 134, the keyboard 116, the mouse 118, and the buttons 120, 122. FIG. 1 also depicts a latch 136 that is incorporated into the lid 104. When the lid 104 is closed, the latch 136 can engage the latch engagement notches 132 in order to lock the lid in the closed position. As depicted in FIG. 1, an antenna 138 is attached or otherwise incorporated into the lid 104. The antenna 138 can be extended during operation and retracted when the DMA server 100 is not operating.

In a particular embodiment, the length 110 of the base 102 is 31.0 centimeters. Further, in a particular embodiment, the width 112 of the base 102 is 25.5 centimeters. Additionally, in a particular embodiment, the height 114 of the base 102 with the lid 104 in the closed position is 7.0 centimeters. Accordingly, the DMA server 100 has a total volume of 5,533.5 centimeters cubed and a footprint area of 790.5 centimeters squared. Further, in a particular embodiment, the DMA server 100 weighs approximately 5.8 kilograms (kg). As such, in a particular embodiment, the DMA server 100 has a total volume that is less than 6,000 centimeters cubed, a footprint area that is less than 800 centimeters squared, and a weight that is less than 6.0 kilograms.

In a particular embodiment, the DMA server 100 is relatively rugged. Particularly, the DMA server 100 is operable in a temperature range from negative twenty degrees Celsius to positive fifty-five degrees Celsius (−20° C. to 55° C.). Also, the DMA server 100 is substantially shock resistant and can withstand a one meter drop. Further, the DMA server 100 is substantially weather resistant, substantially dust resistant, and substantially sand resistant. The DMA server 100 is portable and it can be mounted in a vehicle or carried like a brief case. Further, multiple DMA servers 100 can be deployed as described herein.

Figure 2:
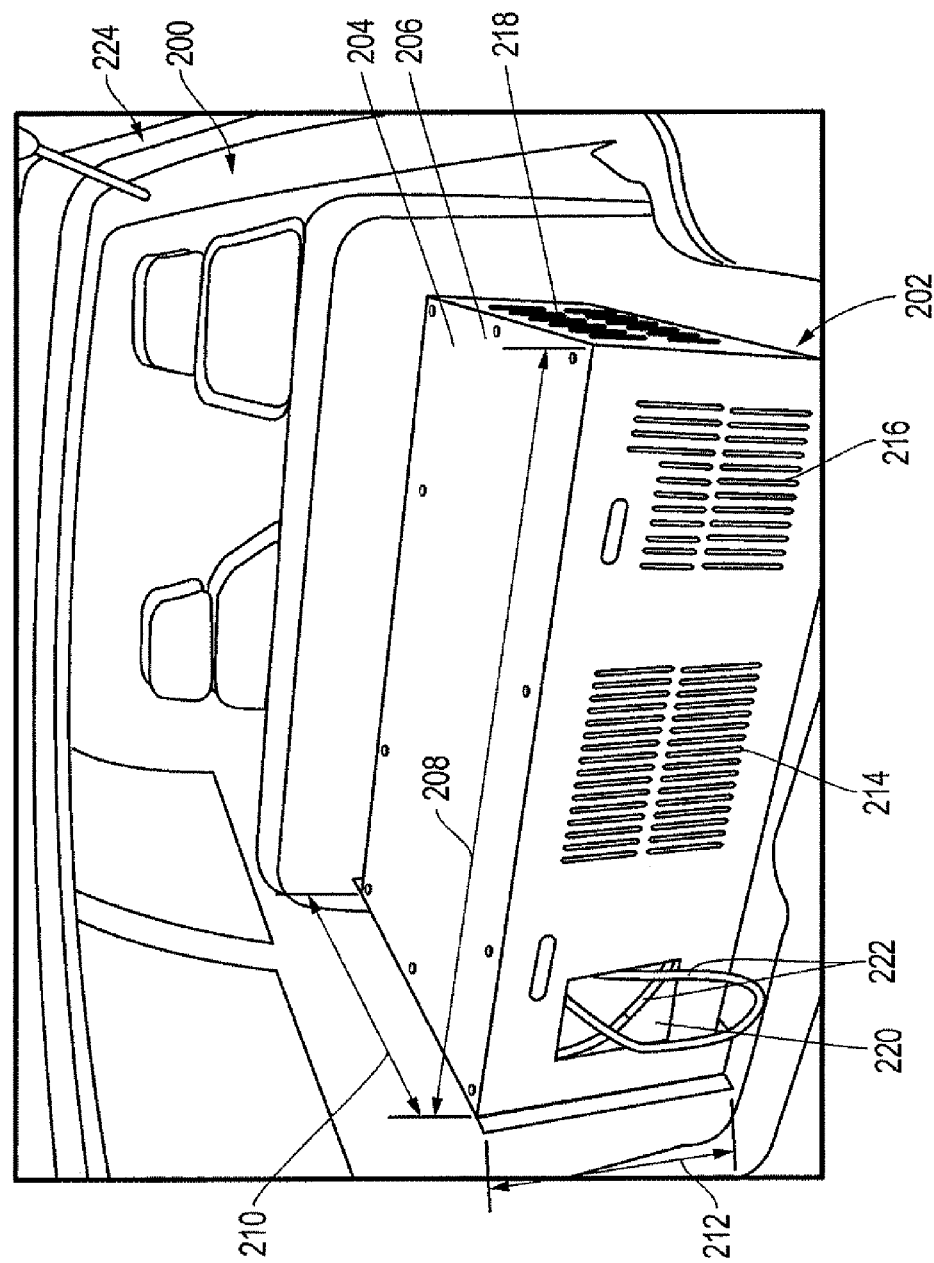
FIG. 2 is a view of an alternative embodiment of a distributed mobile architecture server having a second illustrative form factor.

FIG. 2 depicts an alternative embodiment of a distributed mobile architecture (DMA) server that is generally designated 200. As shown in FIG. 2, the DMA server 200 includes a base 202 and a lid 204 that is coupled to the base 202 via a plurality of fasteners 206, e.g., a plurality of screws. Additionally, the DMA server 200 has a length 208, a width 210, and a height 212. Further, the base 202 of the DMA server 200 includes a first vent 214, a second vent 216, and a third vent 218. In a particular embodiment, the vents 214, 216, 218 permit air exchange with the interior of the base 202 of the DMA server 200 and facilitate cooling of the electronic components of the DMA server 200 housed within the base 202. As shown in FIG. 2, the DMA server 200 includes an access window 220. One or more interfaces 222, e.g., wires, can be accessed via the access window 220 and coupled to a base transceiver station (BTS) during deployment of the DMA server 200. As shown in FIG. 2, the DMA server 200 can be mounted within a vehicle 224. Further, multiple DMA servers 200 can be deployed as described herein.

In a particular embodiment, the length 208 of the base 202 is 92.0 centimeters. Further, in a particular embodiment, the width 210 of the base 202 is 45.0 centimeters. Additionally, in a particular embodiment, the height 212 of the base 202 is 34.0 centimeters. Accordingly, the DMA server 200 has a total volume of approximately 140,760 centimeters cubed and a footprint area of approximately 4,140 centimeters squared. Further, in a particular embodiment, the DMA server 200 weighs approximately 48 kilograms (kg). As such, in a particular embodiment, the DMA server 100 has a total volume that is less than 150,000 centimeters cubed, a footprint area that is less than 5,000 centimeters squared, and a weight that is less than 50.0 kilograms.

Figure 3:
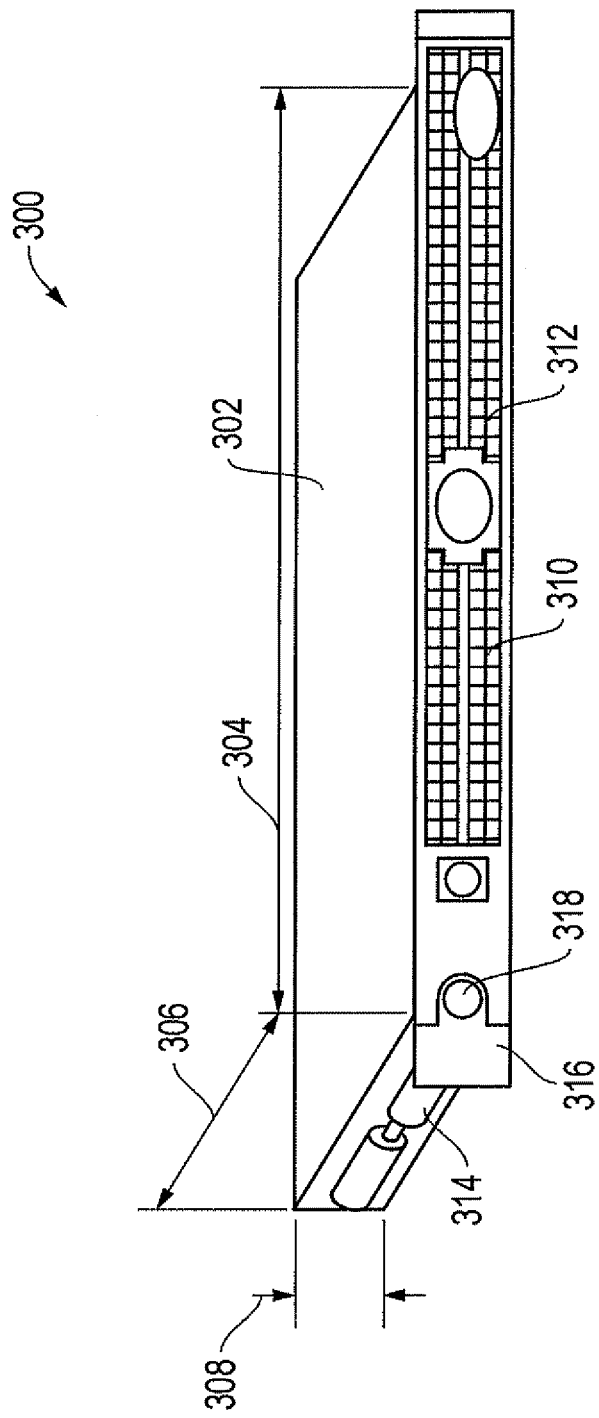
FIG. 3 is a diagram of another alternative embodiment of a distributed mobile architecture server having a third illustrative form factor.

FIG. 3 illustrates another alternative embodiment of a distributed mobile architecture (DMA) server that is generally designated 300. As depicted in FIG. 3, the DMA server 300 includes a housing 302 that has a length 304, a width 306, and a height 308. Additionally, the housing 302 can be formed with a first vent 310 and a second vent 312. In a particular embodiment, the vents 310, 312 permit air exchange with the interior of the housing 302 of the DMA server 300 and facilitate cooling of the electronic components of the DMA server 300 within the housing 302.

As shown in FIG. 3, at least one side of the housing 302 is formed with a rib 314 to allow the DMA server 300 to be slid into a server rack (not shown). Further, the DMA server 300 includes a clip 316 that is coupled to the housing 302 via a fastener 318, e.g., a bolt. The clip 316 can be engaged with a server rack (not shown) to prevent the DMA server 300 from unintentionally sliding out of the server rack (not shown).

Figure 4:
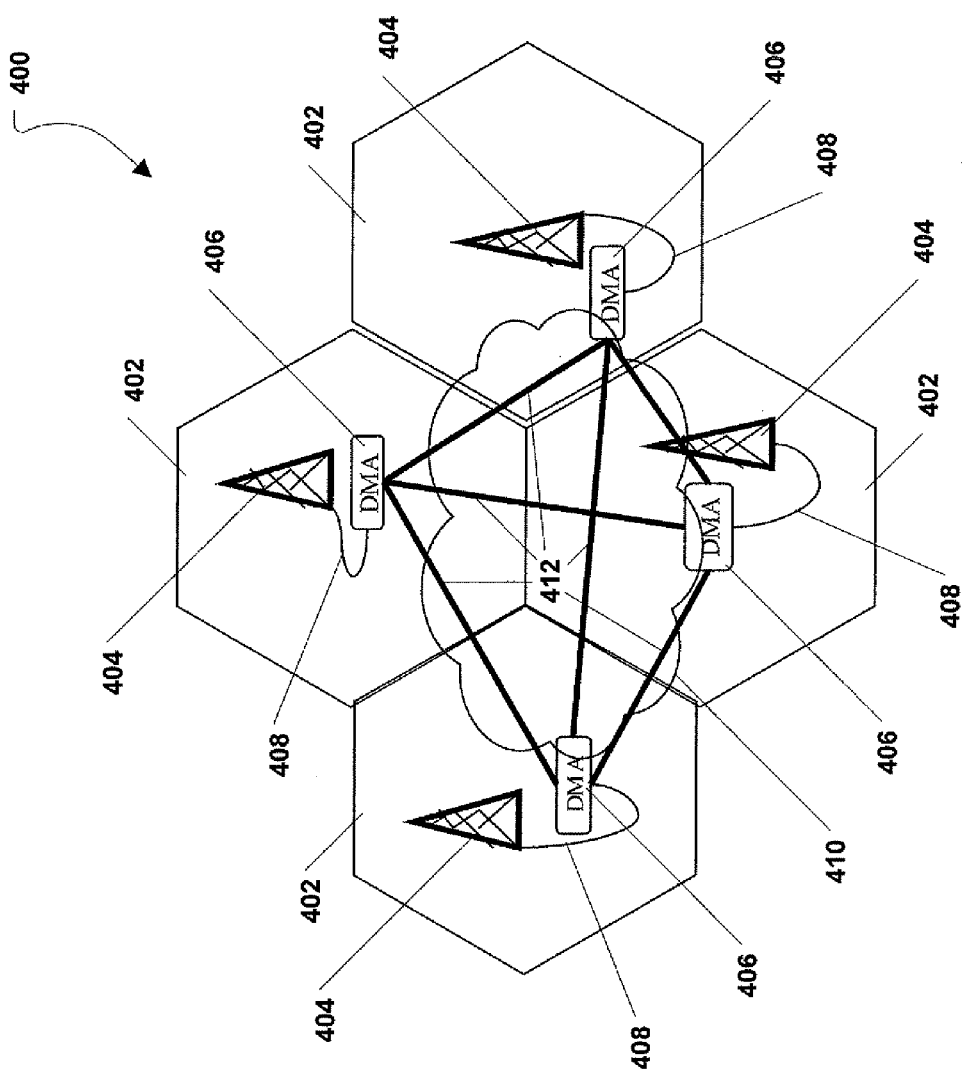
FIG. 4 is a diagram of a distributed and associative communication system.

In a particular embodiment, the length 304 of the housing 302 is approximately 76.2 centimeters. Further, in a particular embodiment, the width 306 of the housing 302 is approximately 48.2 centimeters. Additionally, in a particular embodiment, the height 308 of the housing 302 is approximately 4.3 centimeters. Accordingly, the DMA server 300 has a total volume of approximately 15,756.5 centimeters cubed and a footprint area of approximately 3,672.9 centimeters squared. Further, in a particular embodiment, the DMA server 300 weighs approximately 17.7 kilograms (kg). Also, in a particular embodiment, the DMA server 300 is stackable in order to support various capacity requirements. As such, in a particular embodiment, the DMA server 100 has a total volume that is less than 16,000 centimeters cubed, a footprint area that is less than 4,000 centimeters squared, and a weight that is less than 20.0 kilograms Referring to FIG. 4, a non-limiting, exemplary embodiment of a distributive and associated telecommunications system is illustrated and is generally designated 400. As depicted in FIG. 4, the system 400 includes four cellular coverage sites 402. Each coverage site 402 includes an antenna 404. In one embodiment, the antenna 404 is connected to a transceiver belonging to a base transceiver station (BTS) and the BTS is a 3-sector BTS. FIG. 4 also indicates that a distributed mobile architecture (DMA) server 406 can be connected to each antenna 404. In one embodiment, each DMA server 406 is physically and directly connected to its respective antenna 404, e.g., by a wire or cable 408. Further, in an illustrative embodiment, the DMA servers 406 can be any of the DMA servers shown in FIG. 1, FIG. 2, and FIG. 3.

As illustrated in FIG. 4, each DM server 406 is interconnected with the other DMA servers 406 via an Internet protocol network 410. As such, there exists a peer-to-peer connection 412 between each DMA server 406 in the system 400. As described in detail below, the DMA servers 406 can handle telephony traffic that is communicated at each antenna 404. For example, the DMA servers 406 can switch and route calls received via each antenna 404. Additionally, the DMA servers 406 can hand-off calls to each other as mobile communication devices move around and between the cellular coverage sites 402. The DMA servers 406 can communicate with each other via the IP network 410 and can further transmit calls to each other via the IP network 410. It should be understood that more than four cellular coverage sites 402 can be included in the system and that the inclusion of only four cellular coverage sites 402 in FIG. 4 is merely for clarity and explanation purposes.

Within the distributed and associative telecommunications system 400 the controlling logic can be distributed and de-centralized. Moreover, the wireless coverage provided by the disclosed system 400 is self-healing and redundant. In other words, due to the interconnectivity via the IP network 410, if one or more of the DMA servers 406 loses powers, fails, or is otherwise inoperable, telephony traffic handled by the inoperable DMA server 406 can be re-routed to one of the remaining operable DMA servers 406. Additionally, user data stored in a database, e.g., a home locator resource (HLR) or a visitor locator resource (VLR), can be distributed equally and fully among all of the DMA servers 406. It can also be appreciated that new cellular coverage sites can be easily added to the system 400 as the demand for users increases. Specifically, a DMA server can be deployed as described below, connected to an antenna, connected to the IP network, and activated to provide cellular coverage in a new area.

Figure 5:
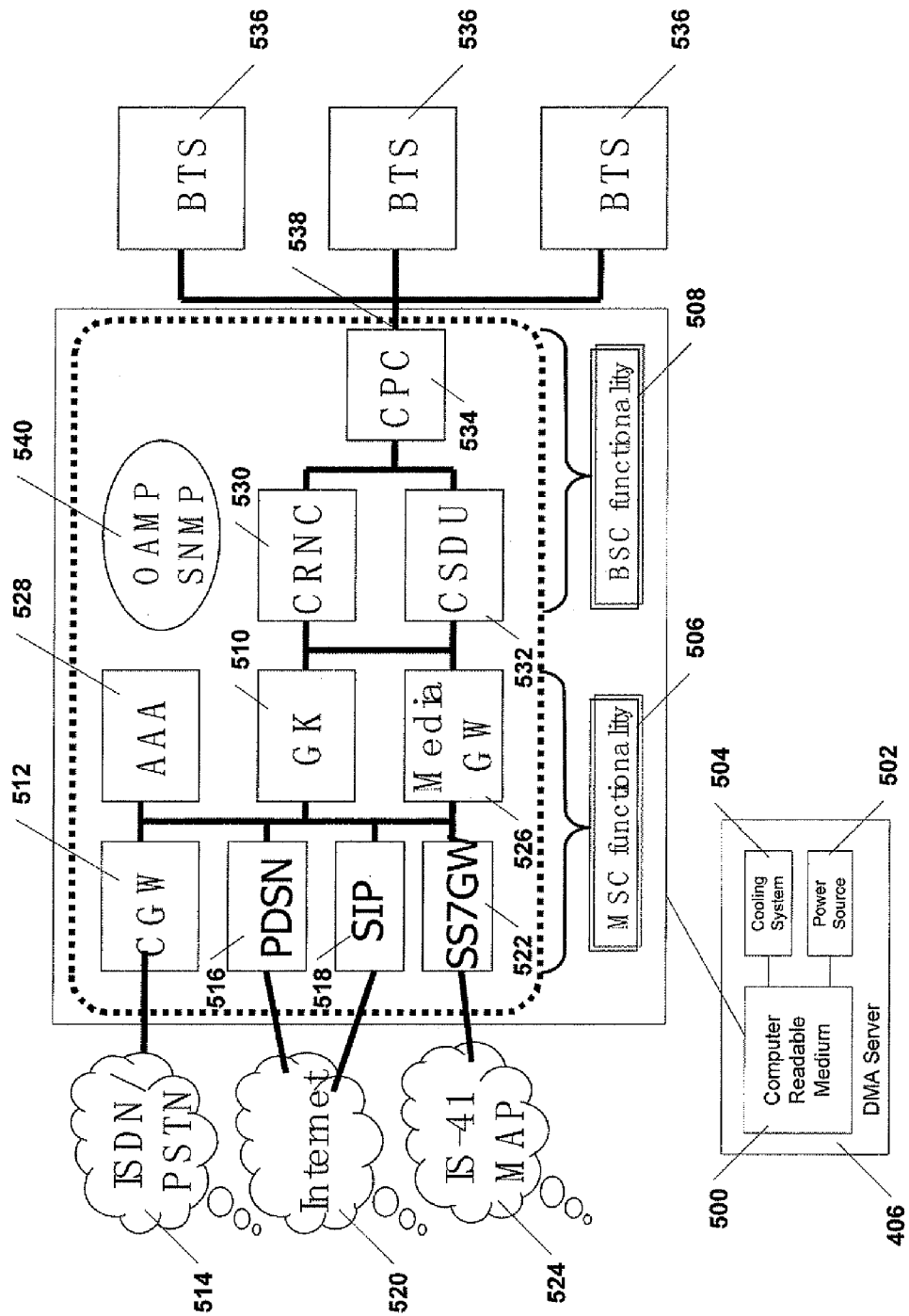
FIG. 5 is a block diagram of a distributed mobile architecture server.

FIG. 5 shows an exemplary, non-limiting, detailed embodiment of a DMA server, e.g., one of the DMA servers 406 described in conjunction with FIG. 4. Further, any of the DMA servers 100, 200, 300 shown in FIG. 1, FIG. 2, and FIG. 3 can include the components depicted in FIG. 5 and described herein.

In a particular embodiment, the DMA server 406 is implemented using a processor, or computer, having a housing and a computer readable medium 500 that is disposed therein. A power supply 502 can also be disposed within the housing of the DMA server 406 in order to provide power to the DMA server 406. The power supply 502 can be a rechargeable battery disposed within the DMA server 406 or it can be external to the DMA server 406, e.g., a standard power outlet. Moreover, a cooling system 504, e.g., a fan with a thermostat, can be provided within the DMA server 406 in order to keep the DMA server 406 from overheating. In an alternative embodiment, the DMA server 406 can be a single board processor that does not require a fan.

As depicted in FIG. 5, the DMA server 406 can include a mobile switching center (MSC) module 506 and a base station controller (BSC) module 508 embedded within the computer readable medium 500. In an exemplary, non-limiting embodiment, the MSC module 506 can include a gatekeeper (GK) 510 that is connected to several gateways. For example, a circuit gateway (CGW) 512 can be connected to the GK 510 and can provide connectivity to an integrated services digital network/public switched telephone network (ISDN/PSTN) interface 514. The CGW 512 can provide a circuit switched to packet data conversion. In an exemplary, non-limiting embodiment, the PSTN portion of the ISDN/PSTN interface 514 can be an inter-office interface that uses the Bellcore industry standard ISDN user part (ISUP) signaling on a signaling system seven (SS7) link set. Moreover, the voice trunks on this interface can be timeslots on a T1 connection. Inbound and outbound voice calls can be supported on the ISDN portion of the ISDN/PSTN interface 514.

As further illustrated in FIG. 5, a packet data server node (PDSN) gateway 516 for CDMA, or a Gateway GPRS Support Node (GGSN) for Global System for Mobile Communication (GSM), and a Session Initiation Protocol (SIP) gateway 518 can also be connected to the GK 510. The PDSN gateway 516 and the SIP gateway 518 can provide connectivity to an Internet protocol (IP) interface 520. Further, the PDSN gateway 516 or a GGSN can establish a reverse tunnel with the PDSN or GGSN gateway 516 using generic routing encapsulation (GRE). Moreover, the PDSN gateway 516, or GGSN, can implement the Pseudo Random Function (PRF)/Foreign Agent (FA) functionality of the DMA server 406 which supports mobile IP functions.

FIG. 5 further shows an SS7 gateway 522 that provides connectivity to an ANSI-41 and GSM Mobile Application Part (P) interface 524. In a particular embodiment, the ANSI-41 interface can be an SS7 TCAP/SCCP interface on the same SS7 link set used for ISUP signaling. The same SS7 point code can be used to identify the DMA server 406 in the ANSI-41 network. The ANSI-41 interface can be used for roamer registration. Further, in an exemplary, non-limiting embodiment, the GSM MAP interface can be an SS7 TCAP/SCCP interface on the same SS7 link set used for ISUP signaling. It can be appreciated that there are different protocols of MAP from MAP/B to MAP/I, but in the illustrative embodiment, the different MP/x protocols are not stacked—they are used independently.

As depicted in FIG. 5, a media gateway 526 can also be coupled to the GK 510. In an exemplary, non-limiting embodiment, the media gateway 526 can include cellular transcoders, one or more intranet gateways, conferencing bridges, and group calling functionality. Further, an authentication, authorization, and accounting (AAA) module 528 can be coupled to the GK 510. In an exemplary, non-limiting embodiment, there are three levels of authentication management. The highest level is for administration, the mid-level is for operations, and the lowest level is for normal users. The functions of the AAA module 528 can be included in the user level.

In an exemplary, non-limiting embodiment, the GK 510 can act as an AAA server and a feather server to support advanced supplementary service, short message service, etc. Moreover, the GK 510 can act as a call manager and can support ISUP and PSTN function calls. Additionally, the GK 510 can act as a signal gateway, e.g., IP to SS7 inter-working, ISUP, GSM MAP or ANSI-41 to PSTN and ANSI-42/GSM. The GK 510 can also function as a data call server.

As illustrated in FIG. 5, the BSC module 508 includes a cellular radio network controller (CRNC) 530 and a cellular selection/distribution unit (CSDU) 532 that are connected to a call protocol controller (CPC) 534. In turn, the CPC 534 can be connected to a plurality of base transceiver stations (BTSs) 536. Specifically, the DMA server 406 includes a BTS interface 538 at the CPC 534 that can be physically and directly connected to the BTSs 536. The CRNC 530 can provide cellular radio resource management and cellular call control. The CSDU 532 can provide Fundamental Channel (FCH) soft handoff and distribution, Link Access Control (LAC) processing for inband signaling, multiplexer (MUX) functions, and centralized power control. Further, the CPC 534 can convert a T1 or E1 message or Asynchronous Transfer Mode (ATM) interface to a data packet message. In a particular embodiment, each BTS 536 supports signals and traffic up to the front point of the CPC 534, e.g., up to the BTS interface 538. Further, in a particular embodiment, the CRNC 530, the CPC 534, the CSDU 532 and the OAMP 540 can perform one or more of the functions of legacy Base Station Controllers (BSC).

In an exemplary, non-limiting embodiment, the BTS interface 538 can be an IS-95A OR IS-2000 interface over E1 or ATM, or the BTS interface 538 can be a GSM BTS interface using MAP or customized application for mobile network enhanced logic (CAMEL). In an illustrative embodiment, the CPC 534 can be connected to one or more BTSs 536. FIG. 5 further shows that the BSC module 508 includes an operations, administration, maintenance, and provisioning (OAMP) module 540. In an exemplary, non-limiting embodiment, the OAMP module 540 can use simple network management protocol (SNMP) for operations interfaces. Further, the OAMP module 540 can include a JAVA user interface. The OAMP module 540 can also include a software agent that is assigned to each component within the DMA server 406. The agents independently monitor their respective components. Moreover, each agent can provision its respective component.

Figure 6:
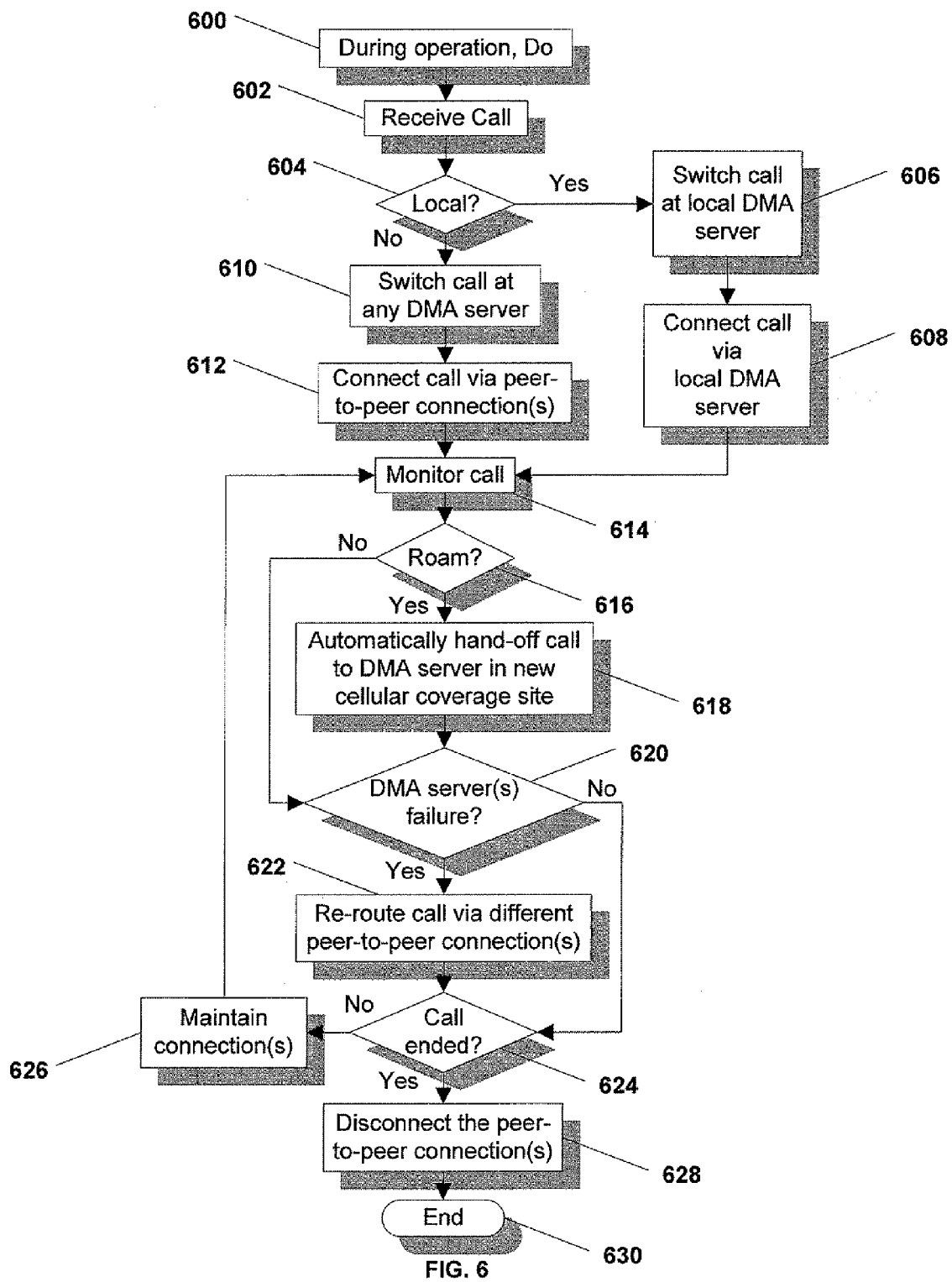
FIG. 6 is a flow chart to illustrate operating logic of a distributed mobile architecture server.

Referring to FIG. 6, a flowchart is provided to illustrate an exemplary, non-limiting embodiment of operating logic of a DMA server 406 (FIG. 4). The operating logic commences at block 600 with a function loop wherein during operation, the succeeding steps are performed. At step 602, a call is received, e.g., at an antenna 404 (FIG. 4) in communication with a DMA server 406 (FIG. 4). Next, at decision step 604 it is determined whether the call is local, i.e., it is determined whether the call is between two mobile communication devices within the same cellular coverage site. If the call is local, the logic moves to block 606, and the call is switched at the local DMA server, i.e., the DMA server within the cellular coverage site in which the call is received. Then, at block 608, the call is connected from the first mobile communication device that initiated the call to a second mobile communication device via the local DMA server. Returning to decision step 604, if the call is not local, the logic proceeds to block 610 and the call is switched at the DMA server connected to the antenna 404 at which the call was received. Thereafter, at block 612, the call is connected from the first mobile communication device that initiated the call to a second mobile communication device via a peer-to-peer connection between a first DMA server and a second DMA server.

After the call is connected, either at block 608 or block 612, the logic continues to block 614 where the call is monitored. For example, the location of the first mobile communication device that initiated the call can be monitored, the location of the second mobile communication device that received the call can be monitored, the DMA server that is handling the call can be monitored, other DMA servers through which the call is connected can be monitored, and the connections (such as the peer-to-peer IP network connection) through which the call is transmitted can be monitored. Proceeding to decision step 616, it is determined if the first mobile communication device or the second mobile communication device involved in the call is roaming, i.e., moving between cellular coverage sites provided by individual antennas. If so, the logic moves to block 618 where the call at the roaming mobile communication device is automatically handed off to a new DMA server and an associated antenna at a new cellular coverage site. If none of the mobile communication devices involved in the call are roaming, the logic moves to decision step 620.

At decision step 620, it is determined whether any DMA server has failed. If so, the call is re-routed around the failed DMA server by establishing one or more different peer-to-peer connections between one or more different DMA servers that are still operable. Thereafter, the logic moves to decision step 624. Decision step 624 can also be reached if it is determined that no DMA servers have failed at decision step 620. At decision step 624, it is determined whether the call has ended. If not, the logic moves to block 626 and the connection or connections through which the call has been established are maintained. Otherwise, if the call has ended, the logic moves to block 628 and the peer-to-peer connection, or connections, through which the call was established are terminated, and the logic ends, at state 630.

Figure 7:
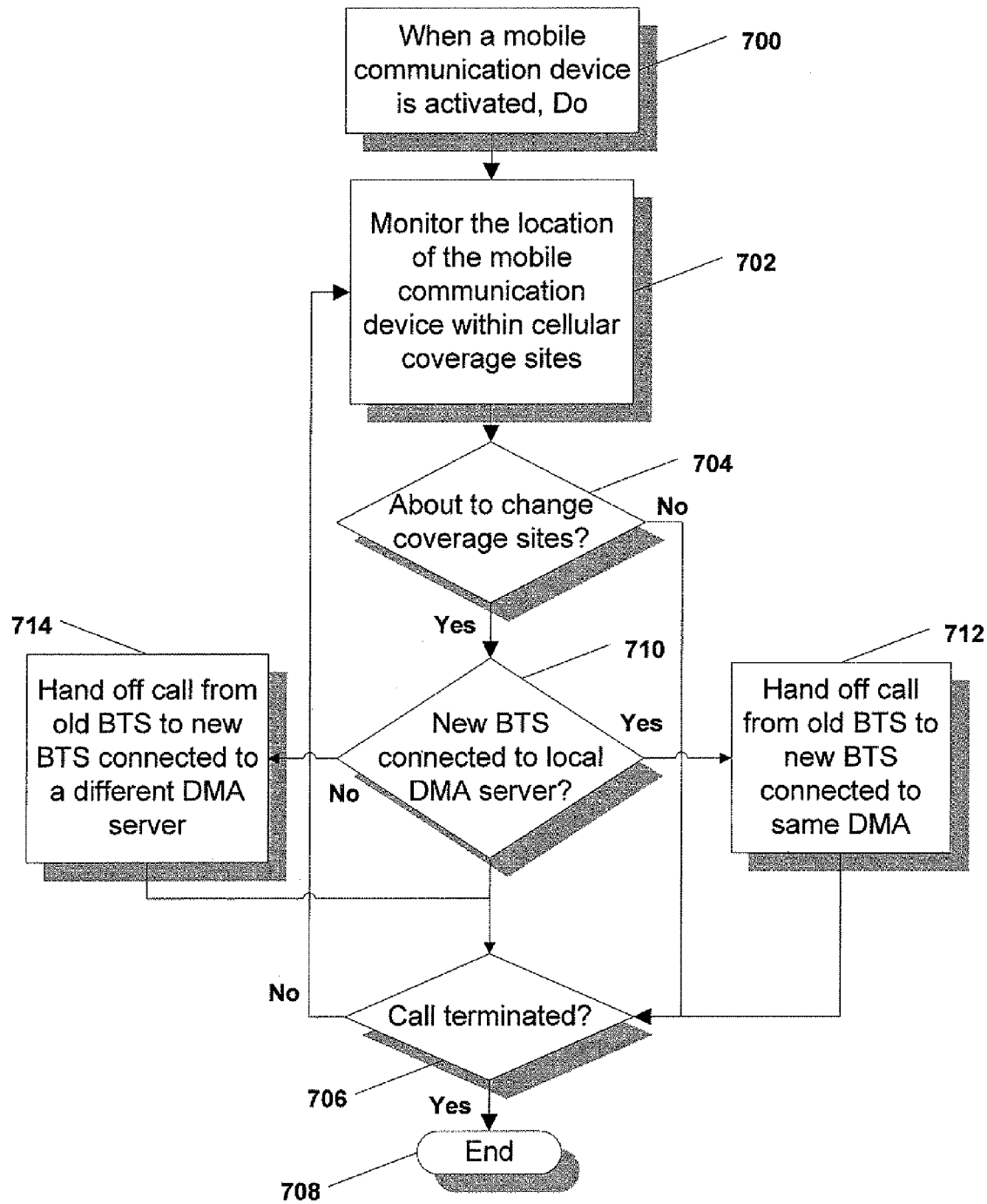
FIG. 7 is a flow chart to illustrate call hand-off logic of a distributed mobile architecture server.

FIG. 7 depicts a flow chart to illustrate call hand-off logic that can be performed by a DMA server 406 (FIG. 4) in order to hand off calls, or user service connections, between a first BTS and a second BTS as a mobile communication device moves between cellular coverage zones. The logic commences at block 700 with a loop wherein when a mobile communication device is activated, the following steps are performed. At block 702, the location of a mobile communication device is monitored at a local DMA server. Continuing to decision step 704, it is determined if the mobile communication device is about to move from a first cellular coverage site provided by a first BTS to a second cellular coverage site provided by a second BTS. If not, the logic moves to decision step 706 where it is determined whether the call has terminated. If the call terminates, the logic ends at state 708. On the other hand, if the call does not terminate, the logic returns to block 702 and continues as described above.

Returning to decision step 704, if the user is about to move from a first cellular coverage site provided by a first BTS to a second cellular coverage site by a second BTS, the logic proceeds to decision step 710. At decision step 710, it is determined whether the second BTS is connected locally, i.e., to the same DMA server as the first BTS. If so, the logic moves to block 712 and the DMA server hands off the call, e.g., as a soft hand off, or the user service connection, from a first BTS connected to the DMA server to a second BTS connected to the same DMA server. Conversely, if the second BTS is not local the logic continues to block 714 where the DMA server hands off the call from a first BTS connected to the DMA server to a second BTS connected to a second DMA server. From block 712 or block 714, the logic proceeds to decision step 706 and continues as described above.

Figure 8:
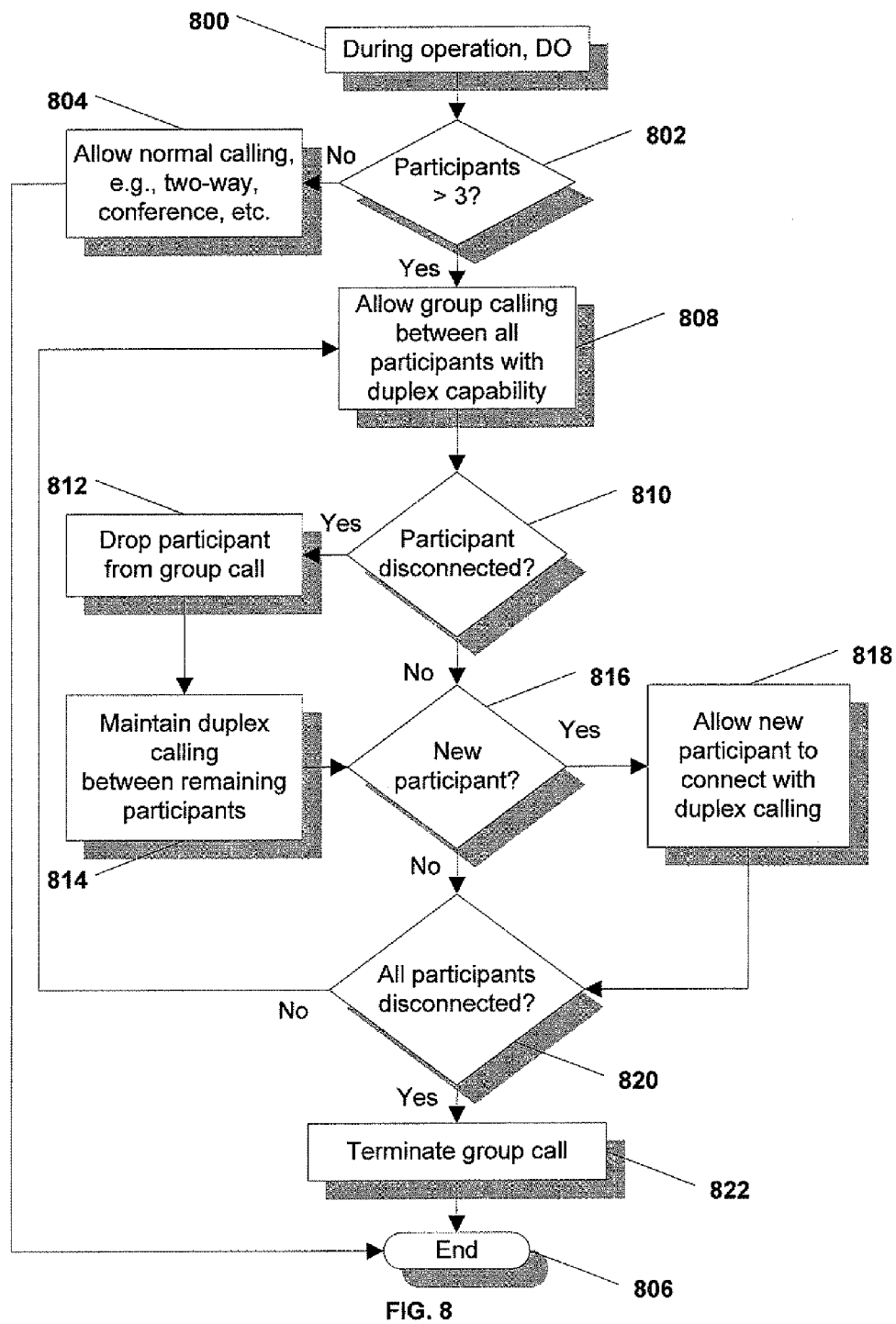
FIG. 8 is a flow chart to illustrate group call logic of a distributed mobile architecture server.

FIG. 8 portrays an exemplary, non-limiting embodiment of a method to illustrate group call logic that can be executed at a DMA 406 (FIG. 4) to provide a group call between several mobile communication devices and PSTN/ISDN users. At block 800, a loop is entered wherein during operation, the following steps are performed. At decision step 802, it is determined whether greater than three (3) callers are participating in a telephone call handled via one or more DMA servers 406 (FIG. 4). If not, the logic continues to block 804 and normal calling, e.g., two-way calling, three-party conference calling, etc., is allowed. The logic then ends at state 806.

At decision step 802, if greater than three (3) callers are participating in a telephone call that is handled via one or more DMA servers 406 (FIG. 4), the logic moves to block 808 and group calling is allowed between all participants with full duplex capability. Next, at decision step 810, it is determined whether one or more participants have disconnected. If so, at decision block 812, the disconnected participant or participants are dropped from the group call. At block 814, full duplex calling is maintained between the remaining group call participants. Returning to decision step 810, if no participants have disconnected, the logic proceeds to decision step 816 where it is determined whether a new participant has connected to the group call. Decision step 816 is also reached from block 814, above.

At decision step 816, if a new participant enters the group call, the new participant is allowed to connect to the group call and may communicate with any one or more of the other participants with full duplex capability. The logic then moves to decision step 820. Decision step 820 is also reached from decision step 816 if no new participants have entered the group call. At decision step 820, it is determined whether all participants have disconnected from the group call. If not, the logic returns to block 808 and continues as described above. On the other hand, if all participants have disconnected from the group call, the logic moves to block 822 where the group call is terminated and then ends at state 806.

Figure 9:
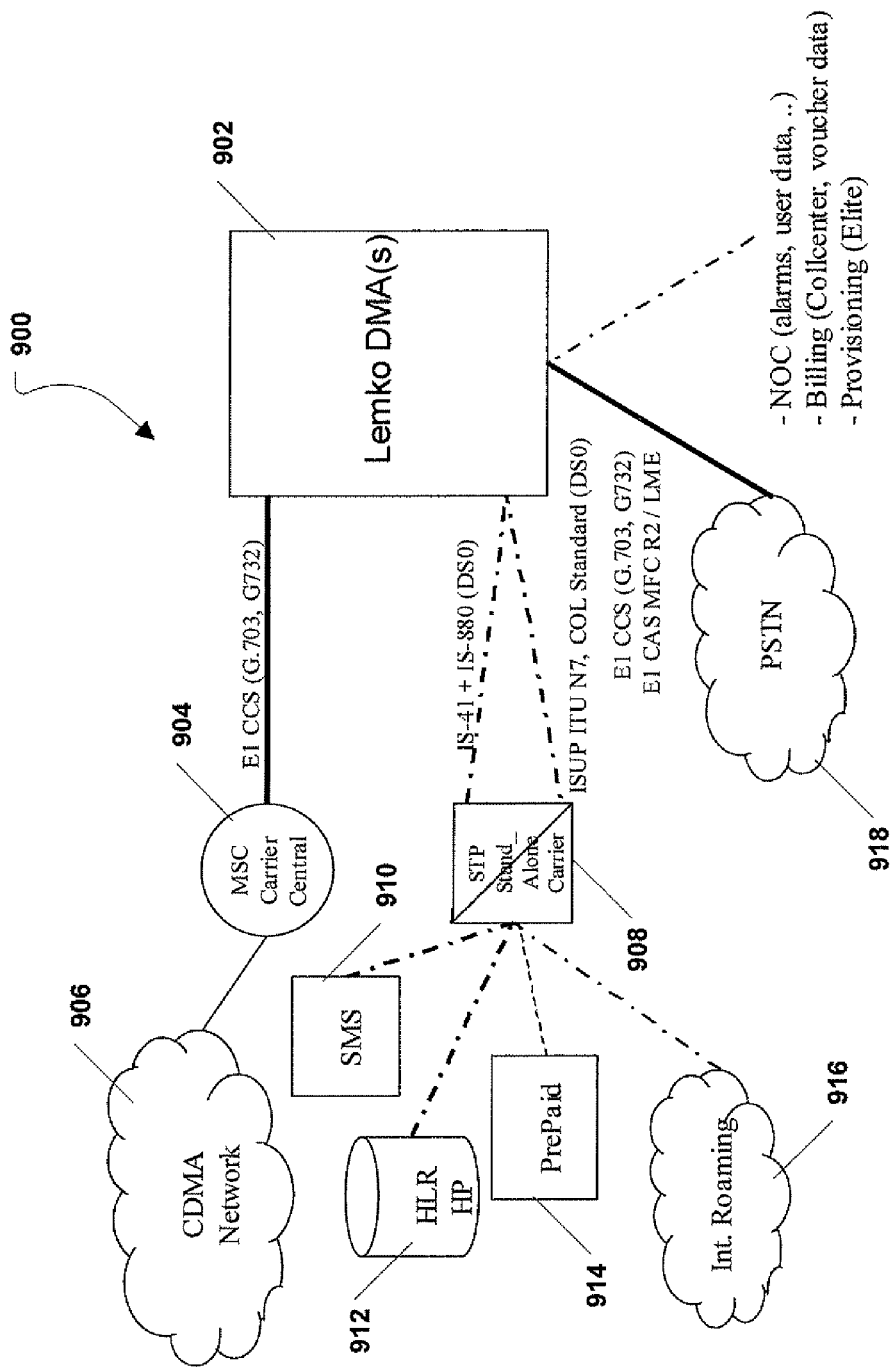
FIG. 9 is a diagram of an exemplary communication system in which a distributed mobile architecture server can be incorporated.

Referring to FIG. 9, an exemplary, non-limiting embodiment of a telecommunications system is shown and is generally designated 900. As shown, the system includes one or more DMA servers 902 that are connected to a wireless carrier's central MSC 904. The DMA server(s) 902 can be connected to the MSC 904 via an E1 CCS (G.703, G732) connection, or any other applicable connection. The MSC 904, in turn, is connected to a code division multiple access (CDMA) network 906. FIG. 9 further shows that the DMA server(s) 902 can be connected to a switching transfer point (STP) 908 of a stand-alone carrier. As shown, the DMA server 902 can be connected to the STP 908 via an IS-41+IS-880 (DS0) connection, or an ISUP ITU N7 connection.

As further depicted in FIG. 9, the STP 908 can be connected to a short messaging service (SMS) server 910 in order to provide text-messaging capabilities for the mobile communication devices using the system 900 shown in FIG. 9. Additionally, the STP 908 can be connected to a home location register (HLR) 912, a pre-paid wireless server 914 and an international roaming network 916 in order to provide pre-paid services and roaming between multiple countries. FIG. 9 shows that the DMA server(s) 902 can be connected to the PTSN 918 via an E1 CCS (G.703, G732) connection, or any other appropriate connection.

Figure 10:
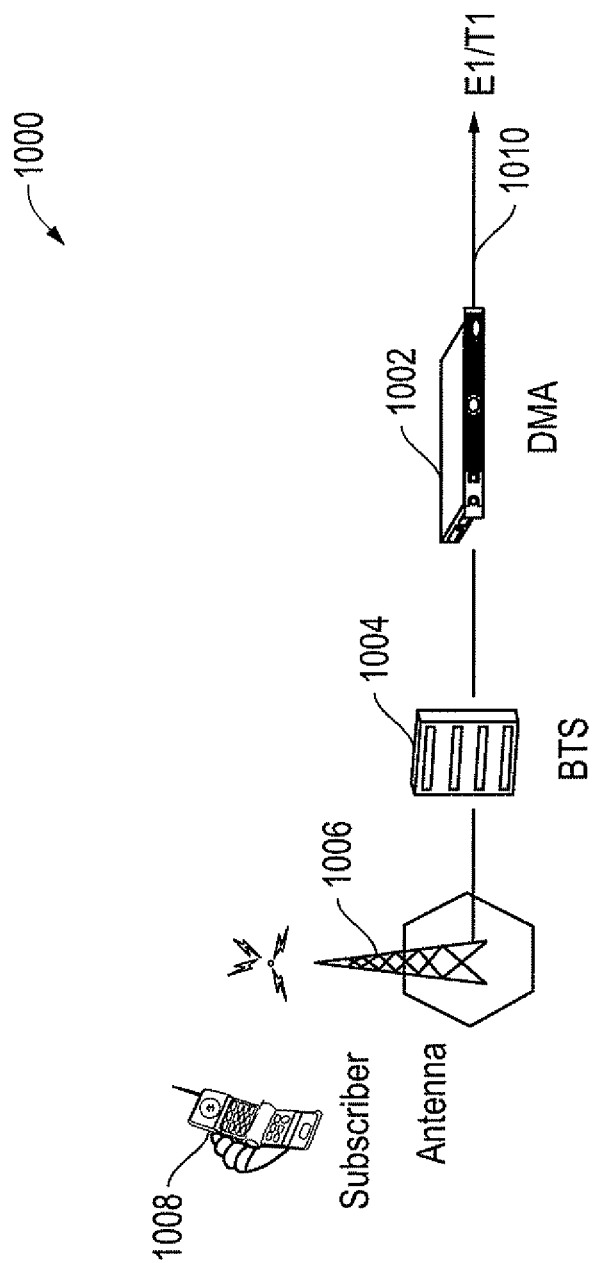
FIG. 10 is a diagram of a wireless local loop communication system in which a distributed mobile architecture server can be incorporated.

Referring to FIG. 10, a wireless local loop (WLL) system is portrayed and is generally designated 1000. As illustrated in FIG. 10, the system 1000 includes a DMA server 1002 that is connected to a BTS 1004. The BTS 1004, in turn, is connected to an antenna 1006. The antenna 1006 provides cellular coverage for one or more subscribers 1008 within transmission distance of the antenna 1006. FIG. 10 indicates that the system 1000 can further include a data network connection 1010 from the DMA server 1002. The data network connection 1010 can connect the DMA server 1002 to the PSTN via an ISUP/ISDN signaling connection on an SS7 link set or a T1/E1 wireless connection. Further, the data network connection 1010 can be an IEEE 802.11 connection between the DMA server 1002 depicted in FIG. 10 and other DMA servers not shown. The DMA server 1002 can beneficially utilize existing infrastructure used for cellular and SMS data services.

Figure 11:
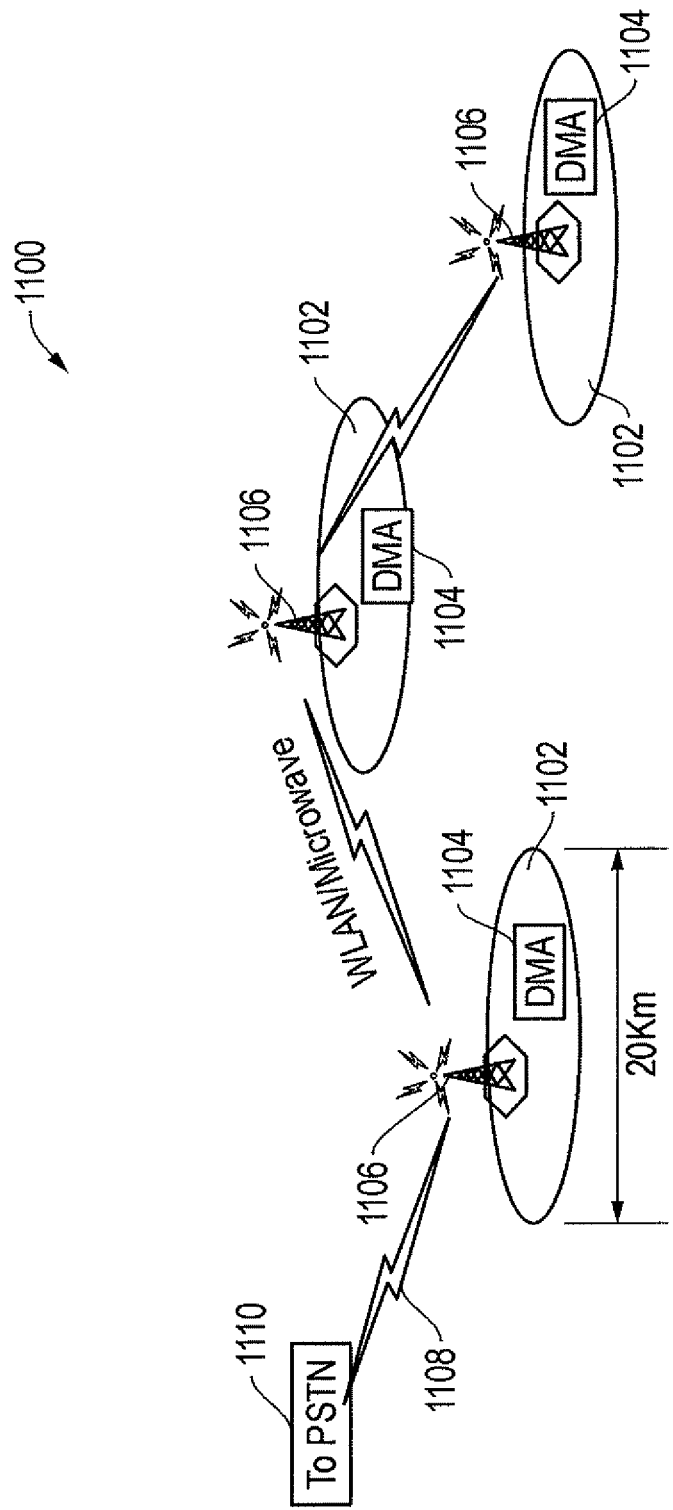
FIG. 11 is a diagram of plural wireless local loop communication systems connected to the public switched telephone network via a single back-haul connection.

FIG. 11 shows a multi-WLL system, generally designated 1100. As shown, the system 1100 includes a plurality of WLLs 1102. Each WLL 1102 can include a DMA server 1104 and an antenna 1106 connected thereto to provide a cellular coverage site around the antenna 1106. As illustrated in FIG. 11, the WLLs 1102 can be interconnected via a wireless local area network (WLAN), or a wide area network, such as a microwave connection. Moreover, a DMA server 1104 within one of the WLLs 1102 can provide a back-haul connection 1108 to the PSTN 1110. This type of deployment scenario can greatly reduce the costs associated with a wireless system. Since the DMA servers 1104 are connected to each other via the WLAN or microwave connections, the relatively expensive inter-site back-haul component is removed. Further, using the hand-off logic, the DMA servers 1104 can enable roaming between the WLLs 1102 and can further provide roaming to an external wireless or other network.

Figure 12:
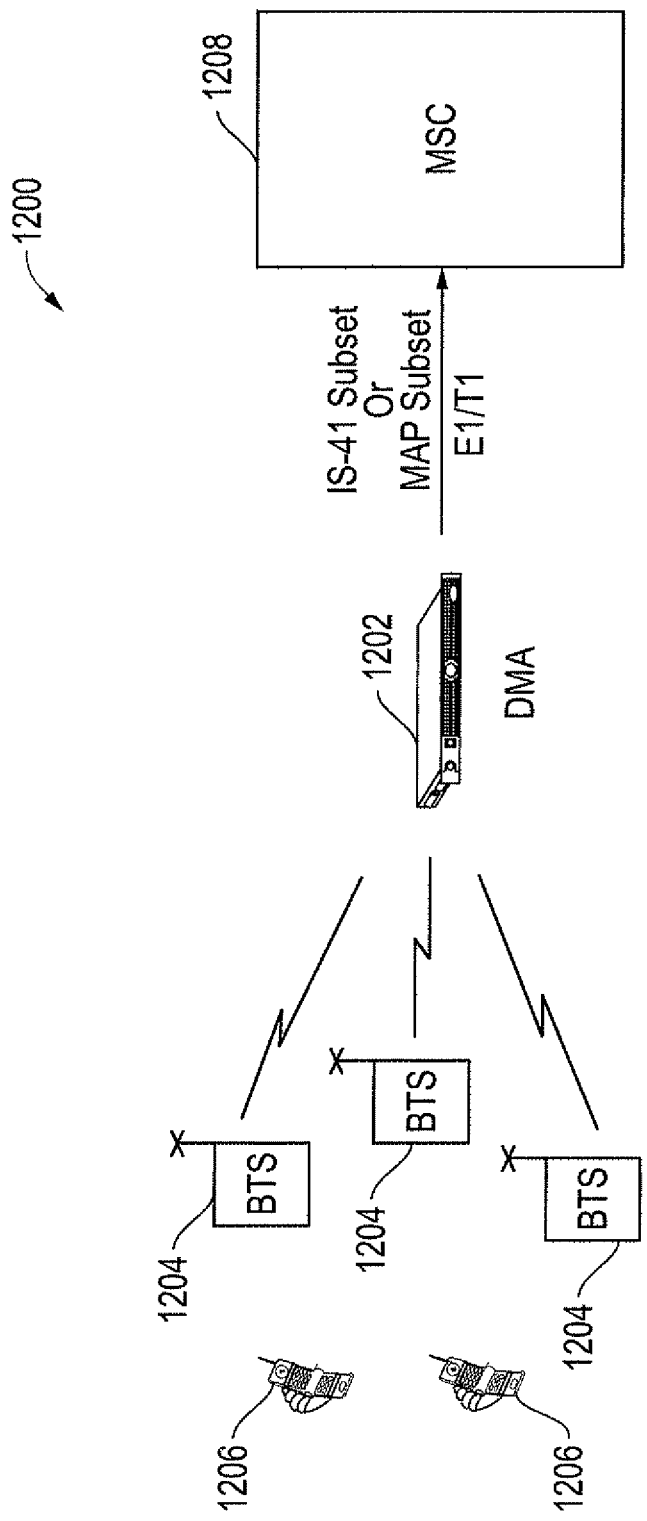
FIG. 12 is a diagram of a communication system in which a distributed mobile architecture server can be deployed to extend an existing cellular network.

Referring to FIG. 12, a telecommunications system is depicted and is designated 1200. As illustrated in FIG. 12, the system 1200 includes a DMA server 1202 that can be connected to a plurality of BTSs 1204. Each BTS 1204 can provide cellular coverage for one or more mobile communication devices 1206, e.g., one or more mobile handsets configured to communicate via the DMA server 1202. FIG. 12 further shows that the DMA server 1202 can be connected to an MSC 1208, such as an MSC of an existing cellular system. The DMA server 1202 can be connected to the MSC via an IS-41 subset or a MAP subset over a wireless E1/T1 connection. With this implementation, the DMA server 1202 can extend an existing cellular network when connected to an existing cellular system MSC 1208.

Figure 13:
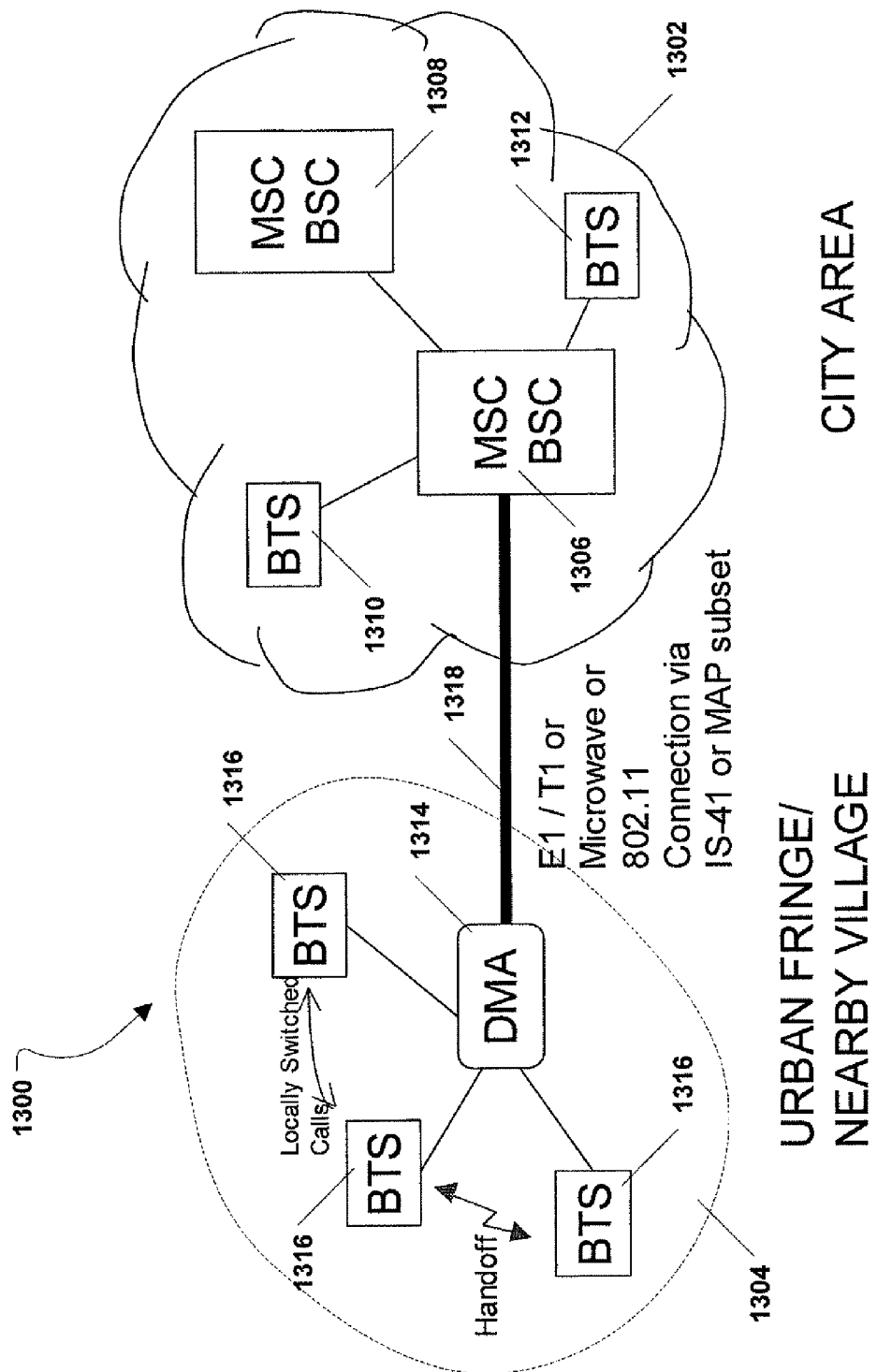
FIG. 13 is a diagram of a communication system in which a distributed mobile architecture server can be deployed to cover urban fringe around an existing network.

FIG. 13 shows an additional telecommunications system, generally designated 1300. As shown, the system 1300 includes a city area coverage site 1302 and an urban fringe/nearby village coverage site 1304. In an exemplary, non-limiting embodiment, the city area coverage site 1302 includes a first MSC/BSC center 1306 connected to a second MSC/BSC center 1308. Also, a first representative BTS 1310 and a second representative BTS 1312 are connected to the first MSC/BSC center 1306. The particular deployment of equipment is configured to provide adequate cellular coverage for mobile communication devices within the city area coverage site 1302.

As illustrated in FIG. 13, the urban fringe/nearby village coverage site 1304 includes a DMA server 1314 having a plurality of BTSs 1316 connected thereto. The DMA server 1314 can provide hand-off of calls between the BTSs 1316 and can switch calls made between the BTSs 1316 locally. However, the DMA server 1314 within the urban fringe/nearby village coverage site 1304 can also connect telephony traffic to the first MSC/BSC center 1306 within the city area coverage site 1302 via a data network connection 1318. In one embodiment, the data network connection can be an E1 connection, a T1 connection, a microwave connection, or an 802.11 connection established via an IS-41 subset or MAP subset. The deployment of a DMA server 1314 in a location such as that described above, i.e., in urban fringe or in a nearby village, and the connection of the DMA server 1314 to an MSC/BSC center 1306 in a city area, can provide service to potential wireless customers that typically would not receive cellular coverage from the city area cellular coverage site 1302. Thus, new subscribers receive access to wireless communication service and can further communicate with wireless customers within the city area cellular coverage site 1302.

Figure 14:
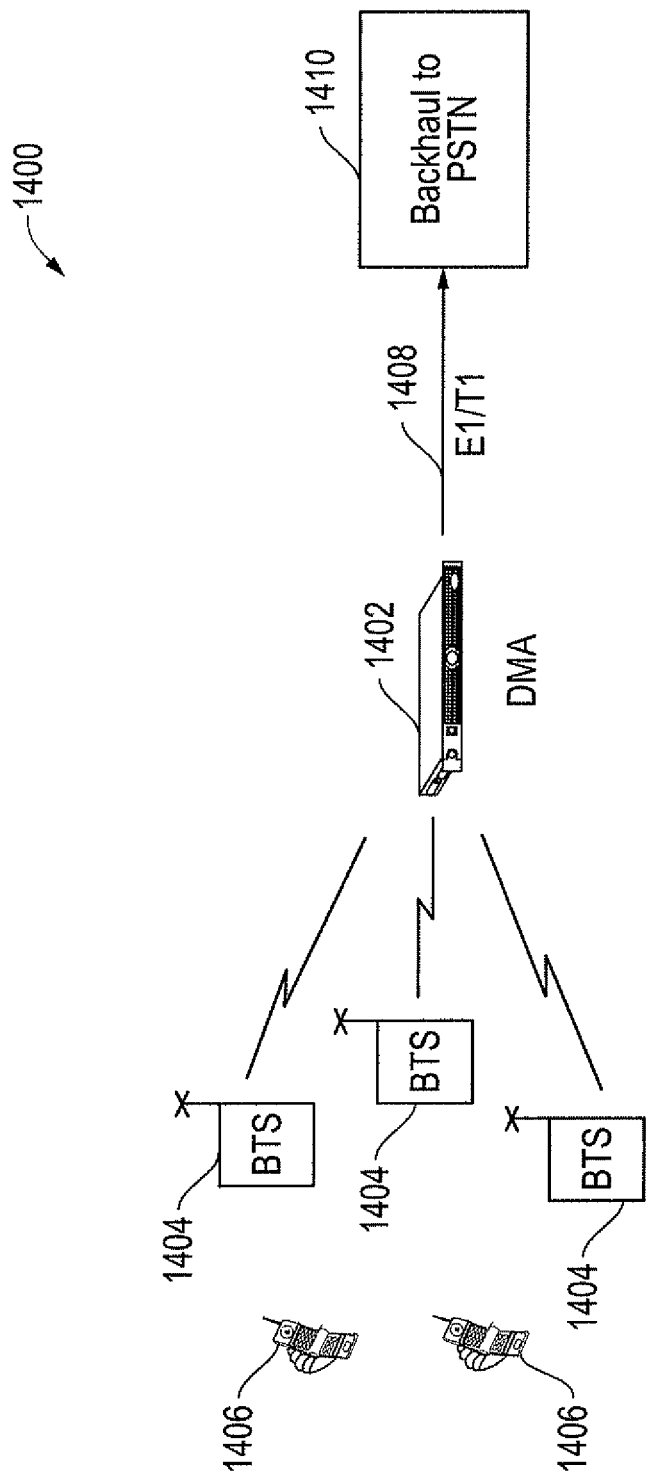
FIG. 14 is a diagram of a communication system in which a single distributed mobile architecture server can be connected to plural base transceiver stations and can provide a single backhaul to the public switched telephone network.

Referring now to FIG. 14, another telecommunications system is depicted and is designated 1400. As illustrated in FIG. 14, the system 1400 includes a DMA server 1402 that can be connected to a plurality of BTSs 1404. Each BTS 1404 can provide cellular coverage for one or more mobile communication devices 1406. FIG. 14 further shows that the DMA server 1402 can include a data network connection 1408 that provides a back-haul connection to the PSTN 1410. In one embodiment, the data network connection can be an E1 connection, a T1 connection, a cable connection, a microwave connection, or a satellite connection. Moreover, the system 1400 depicted in FIG. 14 can be deployed using CDMA IS-95, CDMA 1X, GSM/GPRS, W-CDMA, or other industry standard technologies.

Using a single back-haul connection greatly minimizes costs associated with the wireless communication network. Further, the system 1400 shown in FIG. 14 can be deployed relatively rapidly and can be maintained remotely. Additionally, with the inclusion of the OAMP module 540 (FIG. 5) and the AAA module 528 (FIG. 5), subscriber accounts can be managed locally and billing can be performed locally, i.e., within the DMA server 1402. Moreover, as the number of subscribers increase, the size of the system can be increased modularly, e.g., by adding DMA servers, corresponding BTSs, and the appropriate connections.

Figure 15:
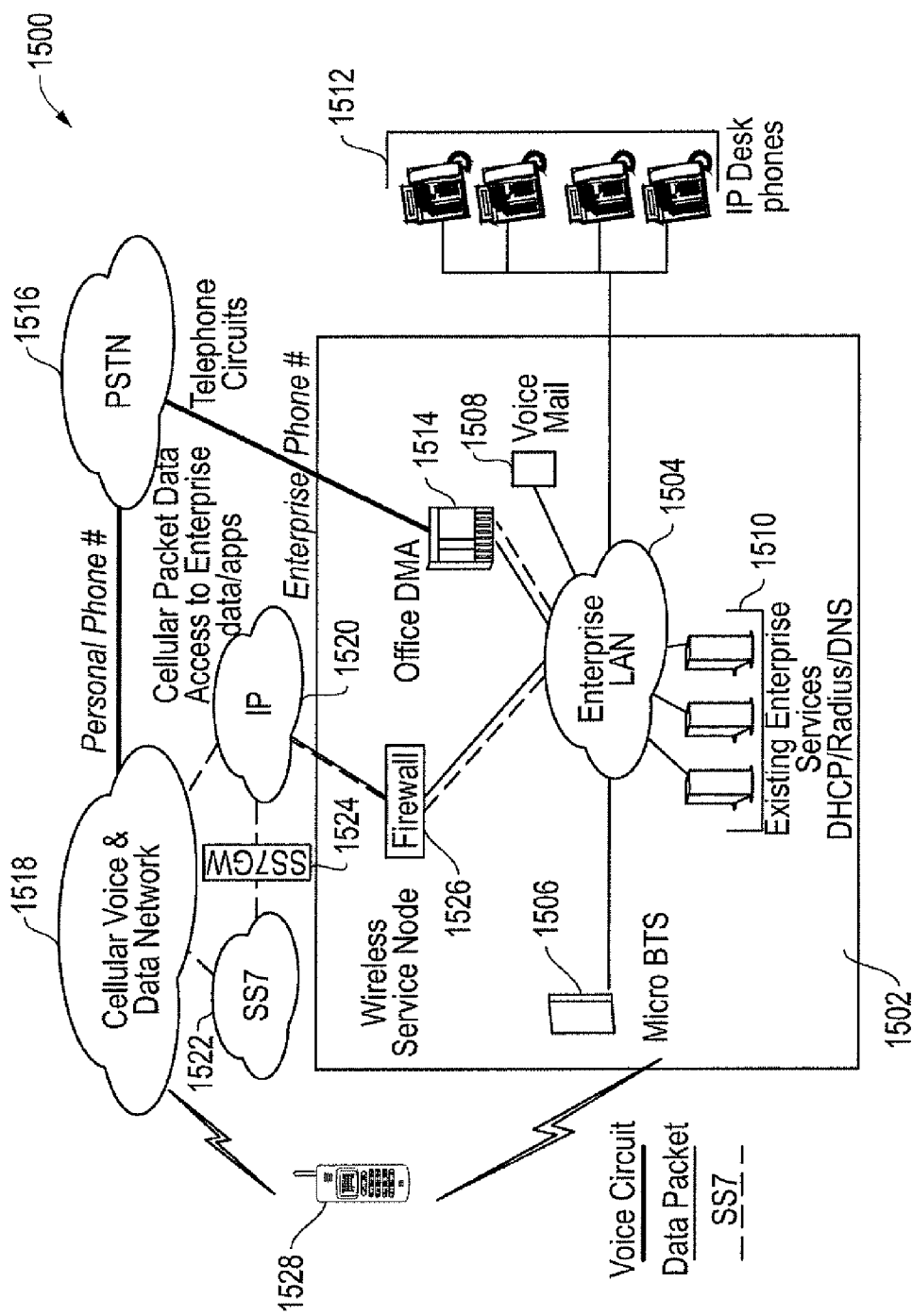
FIG. 15 is a diagram of an in-building communication system in which a distributed mobile architecture server can be deployed.

FIG. 15 illustrates an in-building telecommunications network that is generally designated 1500. FIG. 15 depicts a structure 1502, e.g., an office building, a commercial building, a house, etc. An enterprise local area network (LAN) 1504 is installed within the building 1502. A micro-BTS 1506 is connected to the enterprise LAN 1504. Moreover, a voice mail server 1508 and plural enterprise services servers 1510 are connected to the enterprise LAN 1504. In an exemplary, non-limiting embodiment, the enterprise services servers 1510 can include a dynamic host configuration protocol (DHCP) server, a radius server, a domain name server (DNS), etc. As depicted in FIG. 15, a plurality of phones 1512, e.g., IP desk phones, can be connected to the enterprise LAN 1504.

FIG. 15 further indicates that an office DMA server 1514 can be connected to the enterprise LAN 1504. The office DMA server 1514 can also be connected to the PSTN 1516, which, in turn, can be connected to a cellular voice and data network 1518. The enterprise LAN 1504 can also be connected to the cellular voice and data network 1518 via an Internet protocol (IP) network 1520. A signaling system seven (SS7) network 1522 can be connected to the cellular voice and data network 1518 and the IP network 1520. FIG. 15 also depicts an SS7 gateway 1524 between the SS7 network 1522 and the IP network 1520 and a firewall 1526 between the enterprise LAN 1504 and the IP network 1520. FIG. 15 shows a wireless communication device 1528 in communication with the cellular voice and data network 1518 and the micro-BTS 1506.

Figure 16:
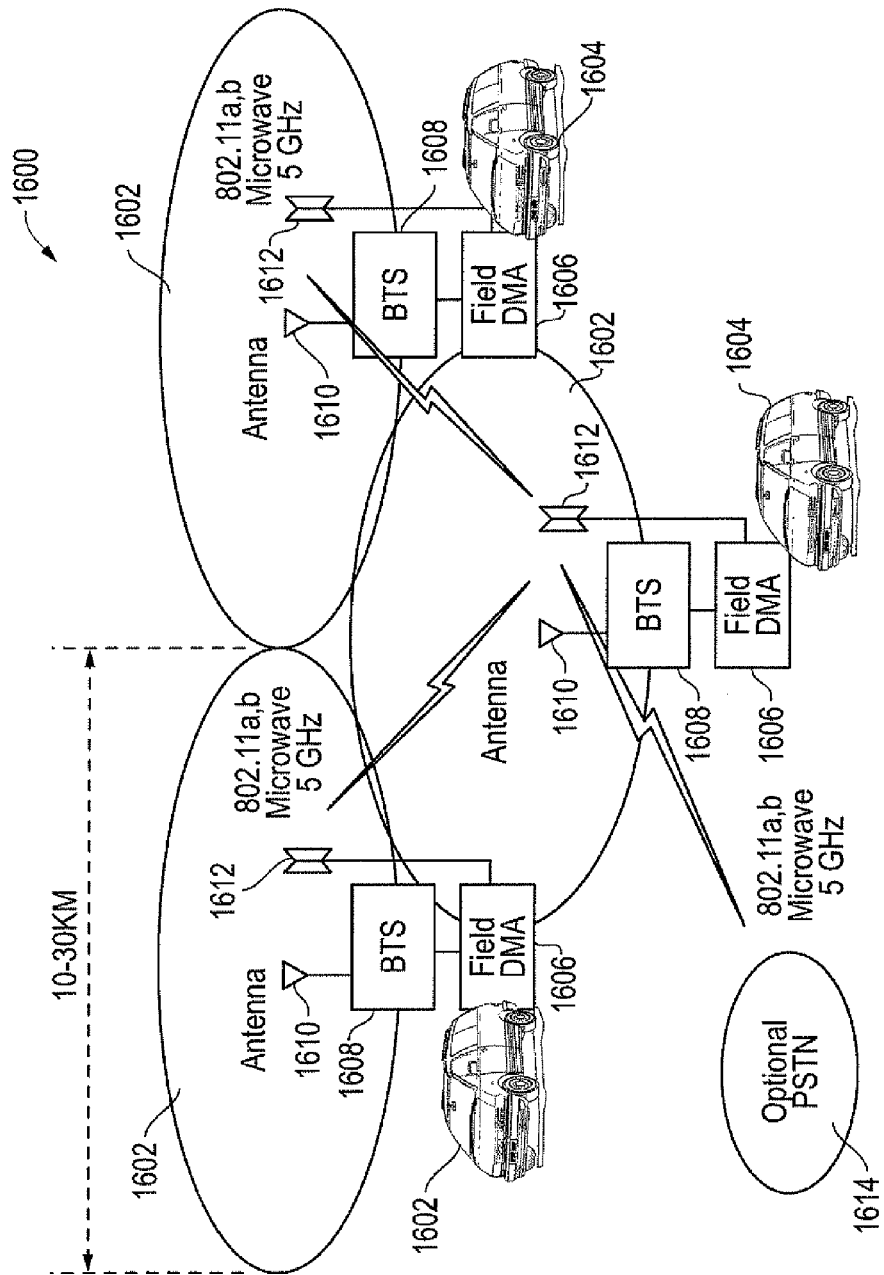
FIG. 16 is a diagram of a mobile in-field communication system in which multiple distributed mobile architecture servers can be deployed via multiple vehicles.

Referring to FIG. 16, a mobile in-field telecommunications system is depicted and is generally designated 1600. As depicted, the system 1600 includes a plurality of mobile cellular coverage sites 1602. Each mobile cellular coverage site 1602 includes a vehicle 1604 in which a field DMA server 1606 is disposed. Moreover, a BTS 1608 is disposed within each vehicle 1604 and is in direct physical connection with the field DMA server 1606, e.g., by a wire or cable connected there between. The field DMA server 1606 and the BTS 1608 can be removably installed within the vehicle 1604 or permanently affixed therein. FIG. 16 further indicates that each BTS 1608 can include an antenna 1610 that is designed to communicate with mobile communication devices. Also, each field DMA server 1606 includes an antenna 1612. In an exemplary, non-limiting embodiment, the field DMA servers 1606 can communicate wirelessly with each other via the antennae 1612, e.g., via 802.11a, 802.11b, microwaves, or other wireless link.

The mobile cellular coverage sites 1602 can be deployed to provide a temporary web of cellular coverage for a plurality of mobile communication devices, e.g., devices carried by soldiers during a battle. The mobile in-field communications system 1600 can be recalled, moved, and re-deployed as necessary. Further, the system can include a wireless connection, e.g., 802.11a, 802.11b, microwaves, to the PSTN 1614.

Figure 17:
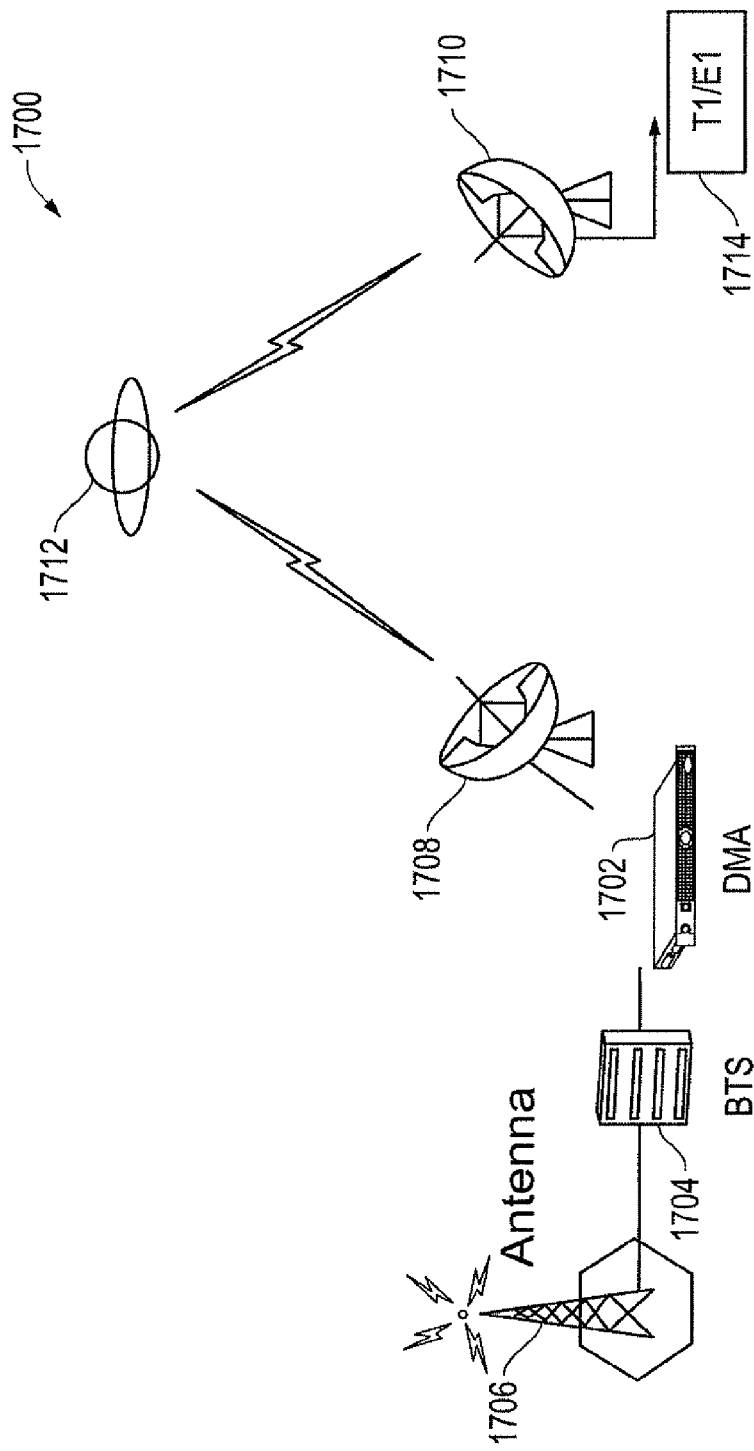
FIG. 17 is a diagram of a communication system in which a distributed mobile architecture server can utilize a satellite connection as a backhaul connection.

Referring to FIG. 17, still another telecommunications system is illustrated and is generally designated 1700. As depicted in FIG. 17, the system 1700 includes a DMA server 1702 that is connected to a BTS 1704. The BTS 1704, in turn, is connected to an antenna 1706. FIG. 17 further illustrates that a first satellite transceiver 1708 is also connected to the DMA server 1702. The first satellite transceiver 1708 communicates with a second satellite transceiver 1710 via a satellite 1712. Additionally, the second satellite transceiver 1710 includes a data network connection 1714, e.g., a T1 connection, or an E1 connection. The satellite transceivers 1708, 1710 and the satellite 1712 can provide a backhaul connection for the DMA server 1702. Or, the satellite transceivers 1708, 1710 and the satellite 1712 can connect the DMA server 1702 to an additional DMA server (not shown).

Figure 18:
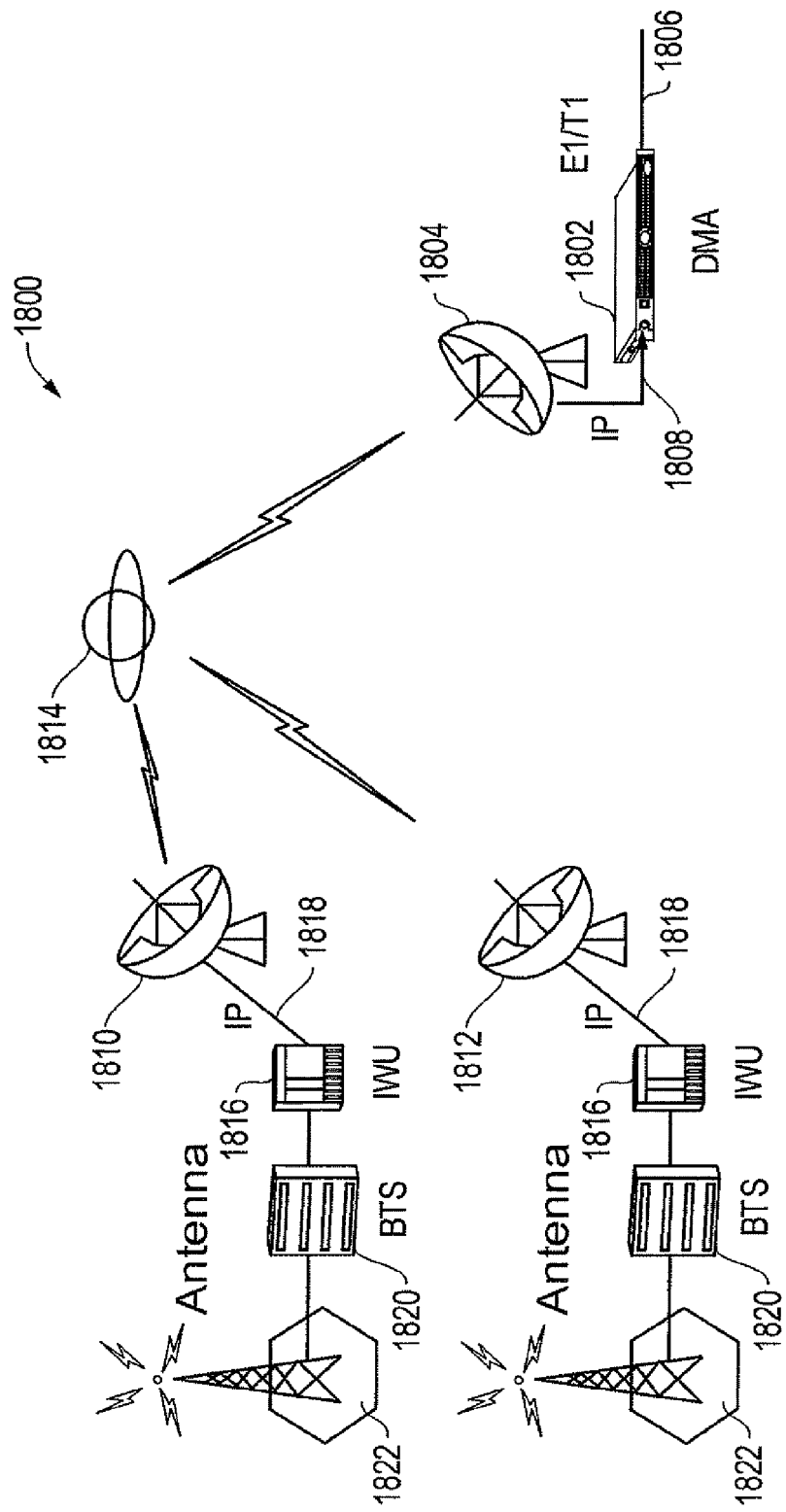
FIG. 18 is a diagram of a communication system in which a distributed mobile architecture server can receive multiple backhaul signals via multiple satellite signals.

FIG. 18 shows yet another telecommunications system that is generally designated 1800. As illustrated in FIG. 18, the system includes a DMA 1802 that is connected to a first satellite transceiver 1804. Moreover, the DMA 1802 includes a primary network connection 1806, e.g., a T1 connection, or an E1 connection, and a secondary network connection 1808, e.g., an IP connection. FIG. 18 shows that the first satellite transceiver 1804 communicates with a second satellite transceiver 1810 and a third satellite transceiver 1812 via a satellite 1814. Each of the second and third satellite transceivers 1810, 1812 is connected to an interworking unit (IWU) 1816 via a data network connection 1818, e.g., an IP connection. Each IWU 1816 is connected to a BTS 1820, which in turn, is connected to an antenna 1822. The satellite transceivers 1804, 1810, 1812 provide an IP network extension for the DMA server 1802. Moreover, in the deployment illustrated in FIG. 18, the DMA server 1802 can act as a centralized microswitch for handling calls received at the antennas 1822 and transmitted via the second and third satellite transceivers 1810, 1812.

Figure 19:
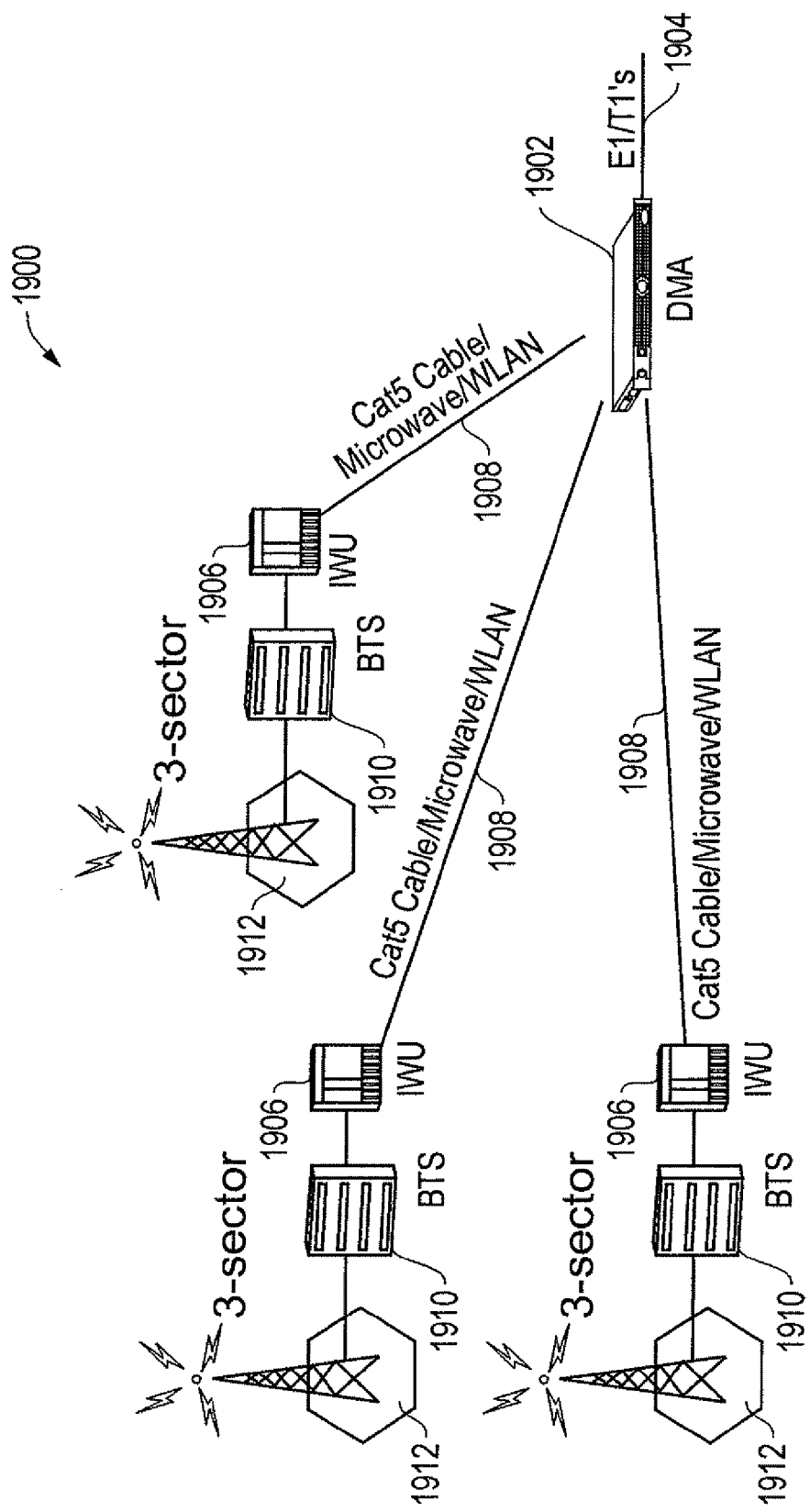
FIG. 19 is a diagram of a communication system in which a single distributed mobile architecture server can be connected to multiple base transceiver stations.

Referring to FIG. 19, another telecommunications system is depicted and is designated 1900. As shown, the system 1900 includes a DMA server 1902 having a primary network connection 1904. Moreover, the DMA server 1902 can be connected to a plurality of IWUs 1906. In an exemplary, non-limiting embodiment, the DMA server 1902 can be connected to each IWU 1906 via a secondary network connection 1908, such as a category five (Cat 5) cable connection, a microwave connection, or a WLAN connection. Further, each IWU 1906 is connected to a BTS 1910 and each BTS 1910, in turn, is connected to an antenna 1912. Each BTS 1910 can be a 3-sector BTS. In the deployment depicted in FIG. 19, the DMA server 1902 can act as a centralized micro-switch that can be used to handle telephony traffic received at the antennae 1912.

Figure 20:
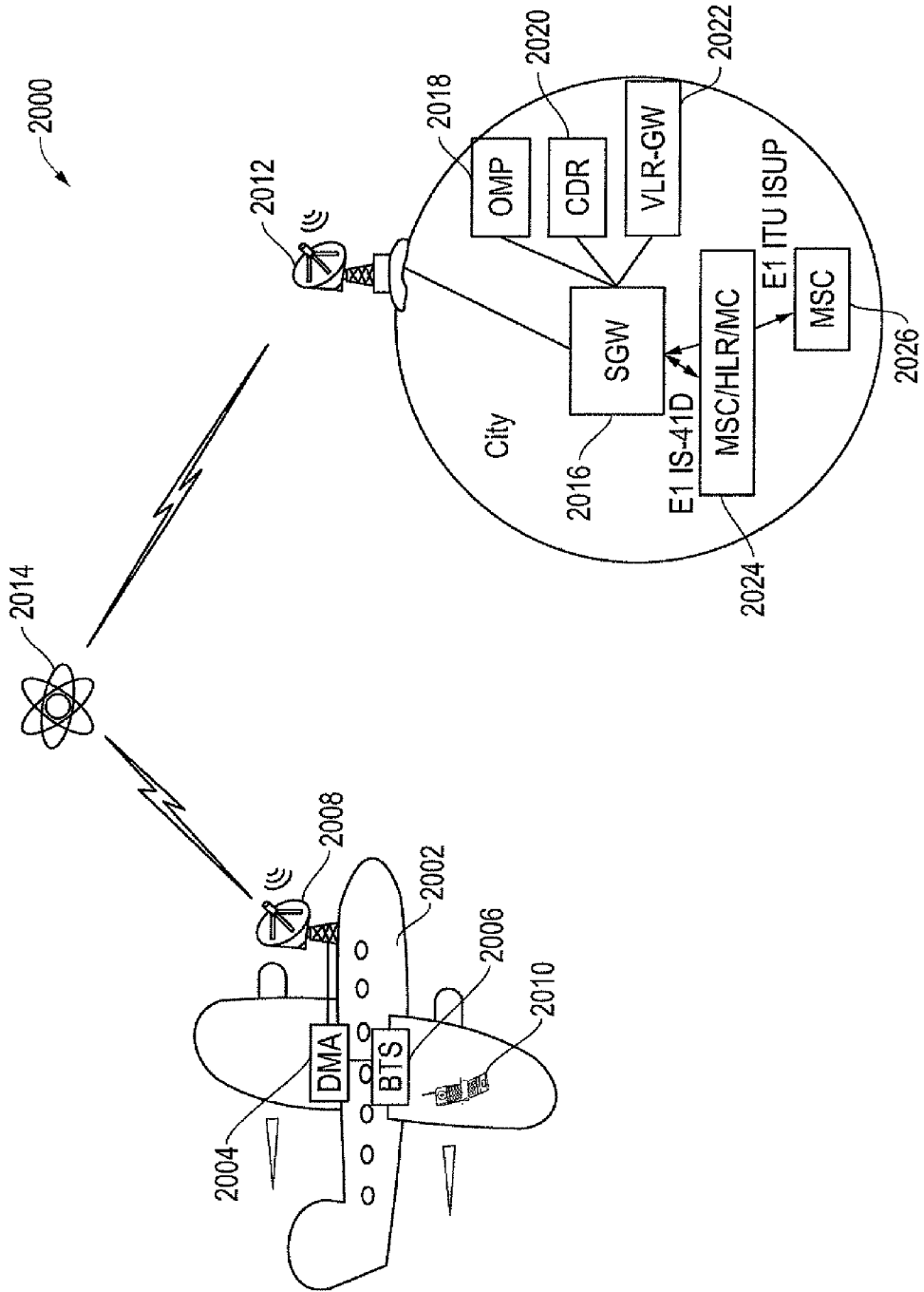
FIG. 20 is a diagram of a mobile communication system in which a distributed mobile architecture server can be deployed via an airplane.

FIG. 20 illustrates yet another embodiment of a communications system, designated 2000. As shown, the system 2000 includes an airplane 2002 in which a DMA server 2004 is installed. As shown, the DMA server 2004 is coupled to a BTS 2006 and a first satellite transceiver 2008. FIG. 20 also shows a mobile communication device 2010 within the airplane 2002. The mobile communication device 2010 can be in wireless communication with the BTS 2006.

In a particular embodiment, the first satellite transceiver 2008 can communicate with a second satellite transceiver 2012 via a satellite 2014. As shown, the second satellite transceiver 2012 can be connected to a terrestrial server gateway 2016, e.g. a DMA server gateway, that can provide connectivity to an operations and management platform (OMP) 2018, a call detail record (CDR) 2020, and a visitor location register gateway (VLR-GW) 2022. The OMP 2018, the CDR 202, and the VRL-GW 2022 can be separate from or incorporated within the server gateway 2016. FIG. 20 further shows that the server gateway 2016 can be connected to a first mobile switching center (MSC) 2024 that is coupled to a second MSC 2026.

Accordingly, the system 2000 shown in FIG. 20 can allow a user in the airplane 2002 to communicate with a ground based telephone. For example, the mobile communication device 2010 can communicate with the BTS 2006, which, in turn, can communicate with the first satellite transceiver 2008 via the DMA server 2004. Further, the first satellite transceiver 2008 can transmit the call to a ground based communication system via the second satellite transceiver 2012 and the satellite 2014.

FIG. 20 shows a single airplane, however, multiple airplanes can be configured as described herein to provide communication from multiple airplanes to ground based telephones. Further, airplane to airplane communication can be provided. Additionally, the system 2000 can include other airborne vehicles, e.g., blimps.

Figure 21:
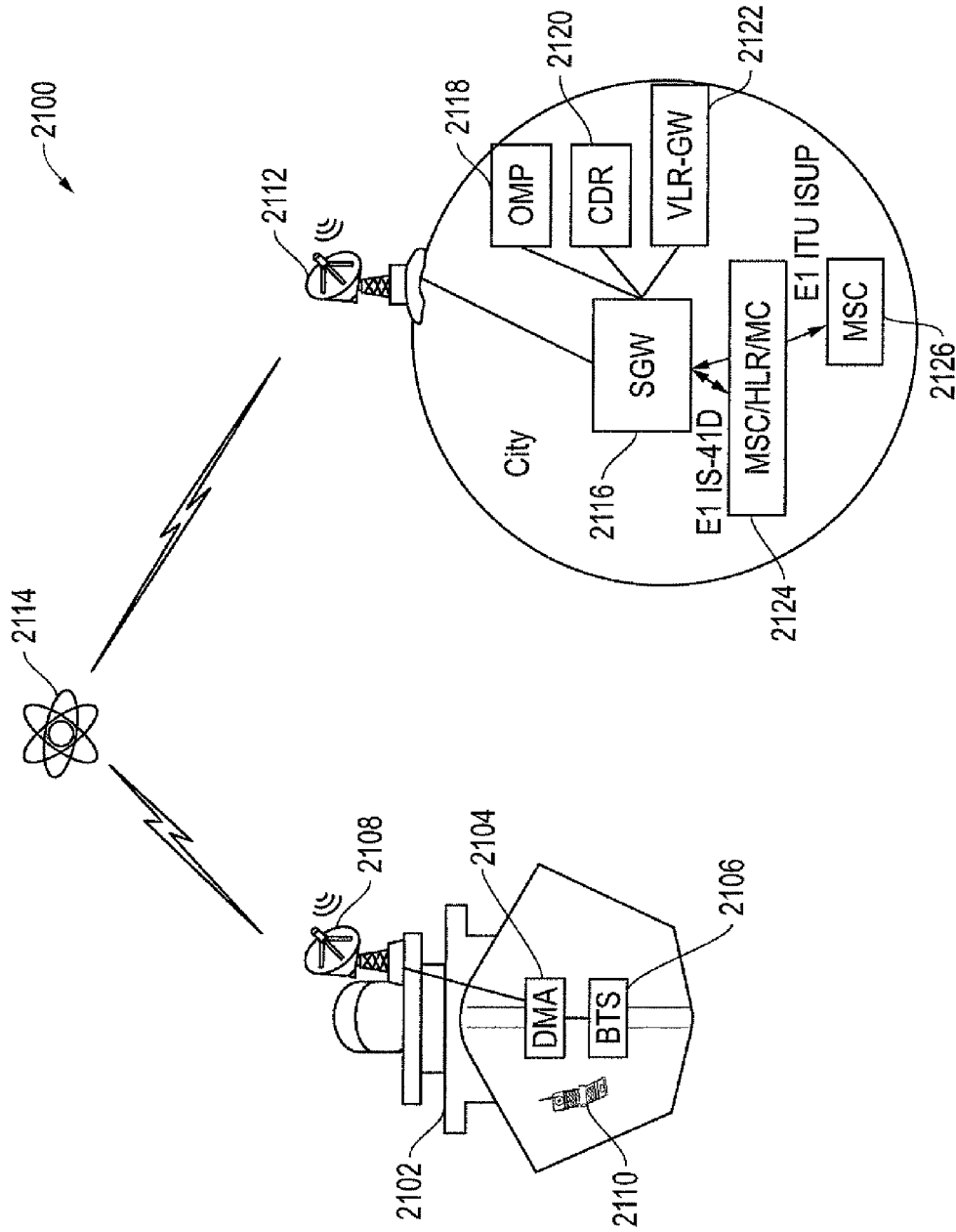
FIG. 21 is a diagram of a mobile communication system in which a distributed mobile architecture server can be deployed via a ship.

FIG. 21 illustrates yet another embodiment of a communications system, designated 2100. As shown, the system 2100 includes a ship 2102 in which a DMA server 2104 is installed. As shown, the DMA server 2104 is coupled to a BTS 2106 and a first satellite transceiver 2108. FIG. 21 also shows a mobile communication device 2110 within the ship 2102. The mobile communication device 2110 can be in wireless communication with the BITS 2106.

In a particular embodiment, the first satellite transceiver 2108 can communicate with a second satellite transceiver 2112 via a satellite 2114. As shown, the second satellite transceiver 2112 can be connected to a terrestrial server gateway 2116, e.g. a DMA server gateway, that can provide connectivity to an operations and management platform (OMP) 2118, a call detail record (CDR) 2120, and a visitor location register gateway (VLR-GW) 2122. The OMP 2118, the CDR 212, and the VRL-GW 2122 can be separate from or incorporated within the server gateway 2116. FIG. 21 further shows that the server gateway 2116 can be connected to a first mobile switching center (MSC) 2124 that is coupled to a second MSC 2126.

Accordingly, the system shown in FIG. 2100 can allow a user within the ship 2102 to communicate with a ground based telephone. For example, the mobile communication device 2110 can communicate with the BTS 2106, which, in turn, can communicate with the first satellite transceiver 2108 via the DMA server 2104. Further, the first satellite transceiver 2108 can transmit the call to a ground based communication system via the second satellite transceiver 2112 and the satellite 2114.

FIG. 21 shows a single ship, however, multiple ships can be configured as described herein to provide communication from multiple ships to ground based telephones. Further, ship to ship communication can be provided. Additionally, the system 2100 can include other waterborne vehicles.

Figure 22:
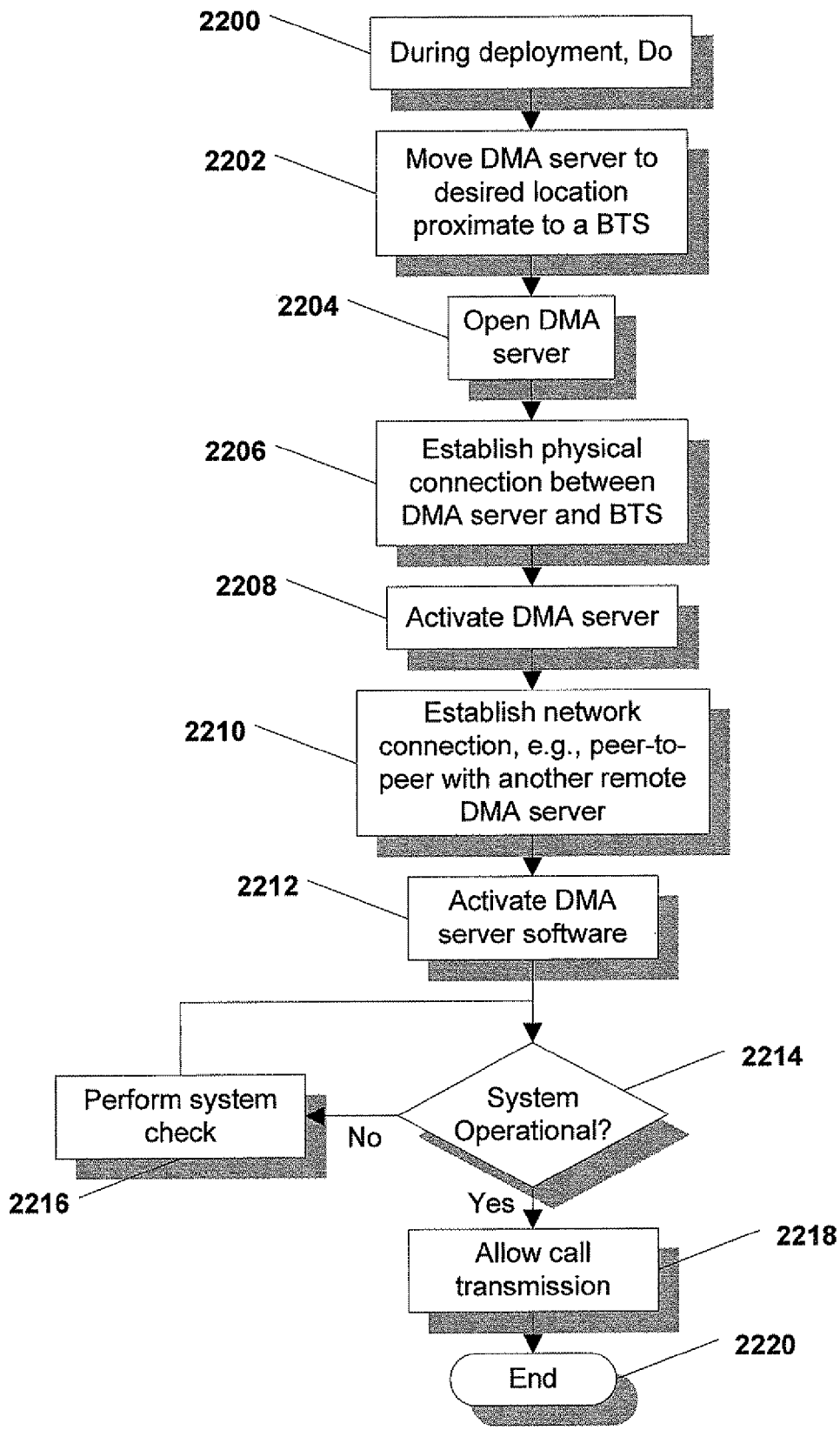
FIG. 22 is a flow chart to illustrate a method of deploying a distributed mobile architecture server.

Referring to FIG. 22, a method of deploying a distributed mobile architecture server is shown and commences at block 2200 wherein during deployment, the succeeding steps are performed. At block 2202, the DMA server is moved to a desired location proximate to a BTS. Moving to block 2204, the DMA server is opened. For example, if the DMA server is the DMA server shown in FIG. 1, the latch is unlocked and the lid is rotated about the hinges into the open position. Proceeding to block 2206, a physical connection is established between the DMA server and the BTS, e.g., the BTS is coupled to the DMA server via a wire.

Continuing to block 2208, the DMA server is activated, e.g., powered on. At block 2210, a network connection is established with another remote DMA server. In a particular embodiment, the network connection is a peer-to-peer connection between the DMA servers. Moving to block 2212, DMA server software within the DMA server is activated. Thereafter, at decision step 2214, it is determined whether the system is operational. That decision can be a performed by the DMA server, e.g., by a self-diagnostic routine or module within the DMA server. Alternatively, that decision can be determined manually by a technician. If the system is not operational, a system check is performed at block 2216. In a particular embodiment, the system check performed at block 2216 is performed by a self-diagnostic routine or module within the DMA server. On the other hand, a technician can perform the system check. After the system check, the logic then returns to decision step 2214 and continues as described herein. At decision step 2214, if the system is operational, the method proceeds to block 2218 and call transmission is allowed. The method then ends at state 2220.

Figure 23:
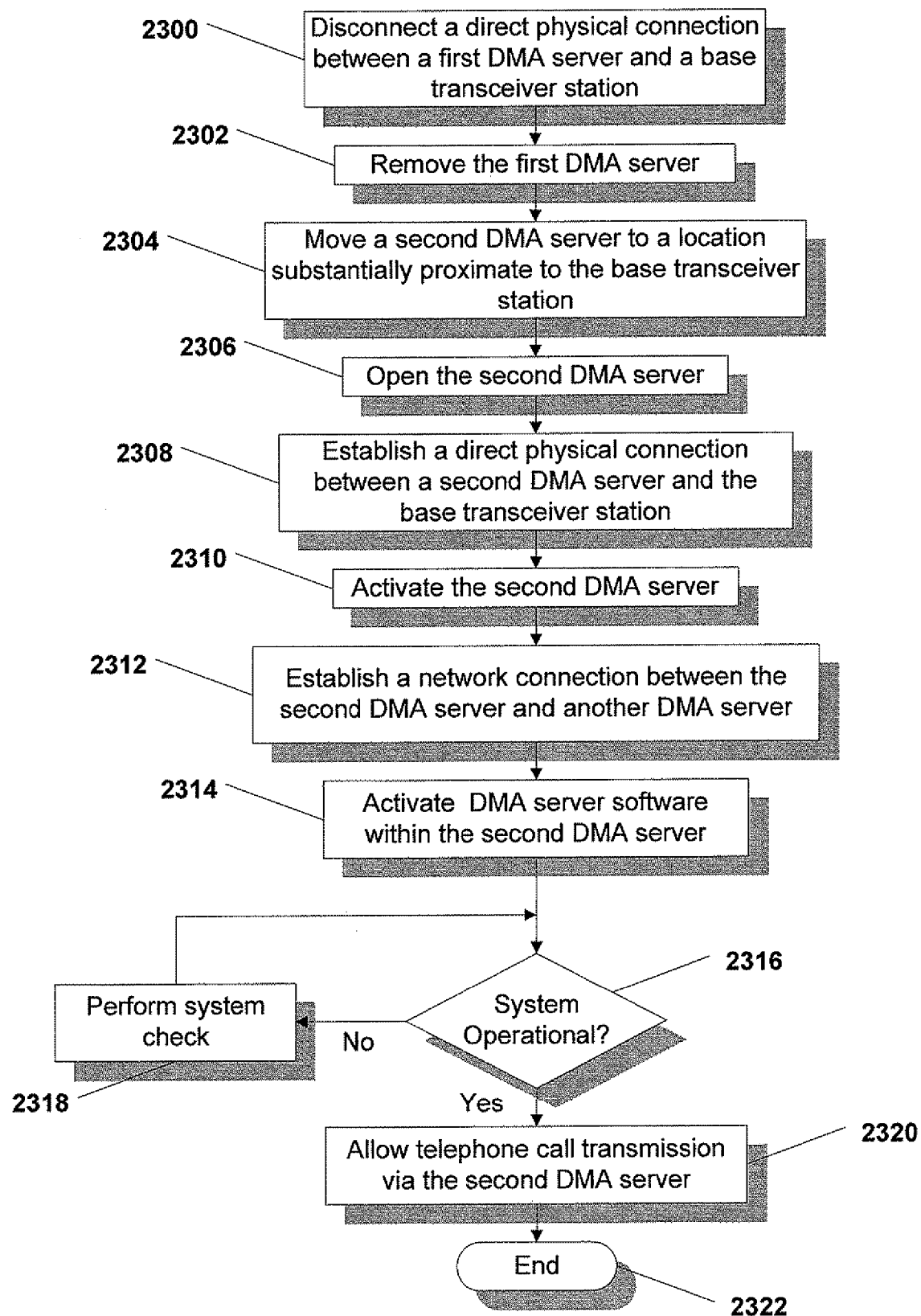
FIG. 23 is a flow chart to illustrate a method of replacing a distributed mobile architecture server.

Referring to FIG. 23, a method of deploying a distributed mobile architecture server is shown and commences at block 2300 wherein a direct physical connection between a first DMA server and a base transceiver station is disconnected. At block 2302, the first DMA server is removed. Proceeding to block 2304, a second DMA server is moved to a location that is substantially proximate to the base transceiver station. At block 2306, the second DMA server is opened. For example, if the DMA server is the DMA server shown in FIG. 1, the latch is unlocked and the lid is rotated about the hinges into the open position. Next, at block 2308, a direct physical connection is established between the second DMA server and the base transceiver station.

Continuing to block 2310, the second DMA server is activated. At block 2312, a network connection is established between the second DMA server and another remote DMA server. In a particular embodiment, the network connection is a peer-to-peer IP connection between the DMA servers. Further, in a particular embodiment, the peer-to-peer connection is established via a private IP network. At block 2314, DMA server software within the second DMA server is activated.

Proceeding to decision step 2316, it is determined whether the system is operational. That decision can be a performed by the second DMA server, e.g., by a self-diagnostic routine or module within the second DMA server. Alternatively, the decision can be determined manually by a technician. If the system is not operational, a system check is performed at block 2318. In a particular embodiment, the system check performed at block 2318 is performed by a self-diagnostic routine or module within the second DMA server. On the other hand, a technician can perform the system check. After the system check, the logic then returns to decision step 2316 and continues as described herein. At decision step 2316, if the system is operational, the method proceeds to block 2320 and call transmission is allowed via the second DMA server. The method then ends at state 2322.

Figure 24:
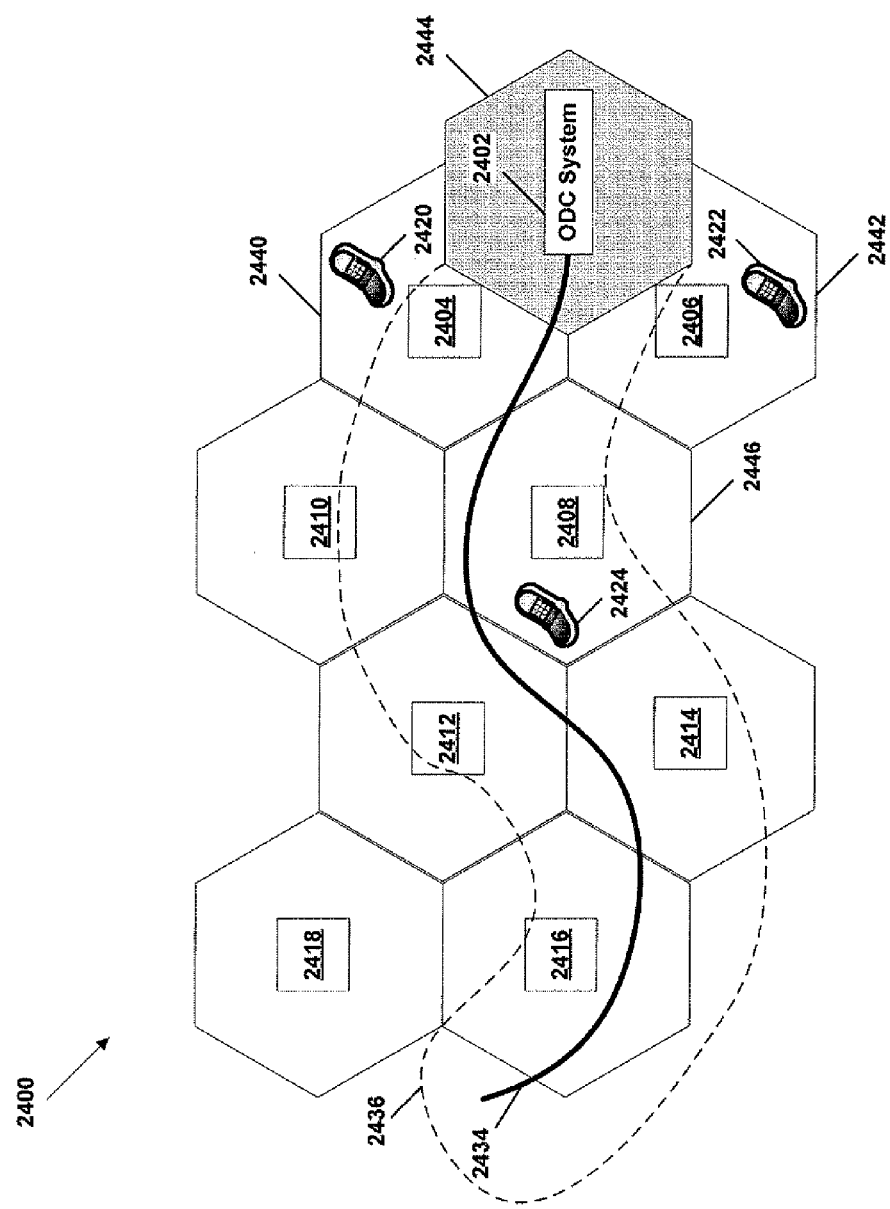
FIG. 24 depicts a first embodiment of a system to control wireless communications.

FIG. 24 depicts a particular embodiment of a system to control wireless communications. The system 2400 includes a mobile base station mimicking system, such as the on-demand cellular (ODC) system 2402. The ODC system 2402 may include one or more distributed mobile architecture servers (DMAs) and one or more base station mimicking modules. The on-demand cellular system 2402 may mimic a commercial wireless network element, such as a base station. Additionally, the ODC system 2402 may be configured to support the commercial wireless network where the ODC system 2402 is deployed. For example, the ODC system 2402 may be configured to communicate with commercial cellular networks commonly used in areas of conflict or war.

The system 2400 also includes a plurality of base stations 2404-2418. The plurality of base stations 2404-2418 may be associated with one or more respective commercial wireless networks. Additionally, each base station 2404-2418 may provide communications services to communication devices, such as personal computers, laptop computers, mobile phones, pagers, or hand-held computing devices, located within a designated coverage region serviced by a respective base station 2404-2418. For example, the base station 2404 may provide communication services to a communication device 2420 located within a coverage region 2440, while the base station 2406 may provide communication services to a communication device 2422 located within a coverage region 2442 and the base station 2408 may provide communication services to a communication device 2424 located within a coverage region 2446. In an illustrative embodiment, each base station 2404-2418 may communicate with communication devices located within the designated coverage region of the respective base station via a different channel. For example, the base station 2404 may communicate with the communication device 2420 within the coverage region 2440 via channel 30. In addition, the base station 2406 may communicate with the communication device 2422 within the coverage region 2442 via channel 31 and the base station 2408 may communicate with the communication device 2424 within the coverage region 2446 via channel 32. The ODC system 2402 may also include a directional antenna and may transmit communication signals to communication devices via the directional antenna.

In an illustrative, non-limiting embodiment, the ODC system 2402 is operational to transmit communication signals with a peak signal strength approximately along a direction of travel 2434 of the ODC system 2402. The communication signals may mimic a base station, such as the base station 2408, which is a neighboring base station of the targeted base stations 2404 and 2406 along the direction of travel 2434 of the ODC system 2402. Further, the communication signals may include ban information related to the targeted base stations 2404 and 2406. The ban information may cause a communication device, such as the communication device 2420, to stop communicating with the base station 2404. In one embodiment, the ban information may include a noise signal. After the communication device 2420 stops communicating with the base station 2404, the communication device 2420 may be induced to communicate via the ODC system 2402 in response to the communication signals transmitted by the ODC system 2402 mimicking the neighboring base station 2408.

In a particular embodiment, the ODC system 2402 is configured for data mining or information gathering. In such an embodiment, the ODC system 2402 may capture data regarding communication devices in a coverage area. For example, the ODC system 2402 may capture mobile communication device identification parameters, subscriber identity module (SIM) identification parameters, time stamps, ODC location stamps, location of a communication device relative to the ODC, mobile communication device activity (e.g., call attempts, numbers called, short messaging service (SMS) attempts, numbers messaged, device status), and so forth. Additionally, the ODC system 2402 may determine a location of a particular communication device.

The ODC system 2402 may also allow monitoring of calls while avoiding the complexity of certain wiretapping systems. For example, communications to and from a target communication device may be passed through the ODC system 2402 and routed to a third party to monitor for intelligence gathering and/or eavesdropping purposes or the ODC system 2402 may monitor communications associated with a particular communication device. Such routing may be transparent to the user of the communication device. The communication activity may be monitored to identify movement or gatherings of communication devices. In addition, communication activity along routes of interest may be monitored and analyzed to identify unusual or suspicious activity that may indicate a threat to an armed services unit or civilians. For example, the communication activity may indicate an increase in cellular traffic before or during a mission of an armed services unit, an increase in cellular traffic at an unusual time of day, or the presence of cell phones may appear to be shadowing an armed services unit. Communication activity may also be monitored to identify communication devices with specific area/country codes, such as out-of-area cell phones, and to track communication device presence in suspicious areas. In an illustrative, non-limiting embodiment, the ODC system 2402 may be configured to search for a particular communication device. For example, the ODC system 2402 may search for a communication device having a particular SIM identification (ID).

In a particular embodiment, the system 2400 may include a roaming feature that controls handoff of a mobile communication device between base stations as the mobile communication device moves further from one base station and closer to another. As the ODC system 2402 moves along the direction of travel 2434, mobile communication devices within a movable region of control 2436 near the ODC system 2402, such as the mobile communication devices 2420 and 2424, may be induced to register with the ODC system 2402 for communication services. The direction of travel 2434 may be predetermined based on a planned course of the ODC system 2402, or it may be dynamically determined based on, for example, global positioning information, trilateralization using base station signals, other position determining methods, or any combination thereof.

In an illustrative embodiment, a roaming feature or a handoff feature may be set up such that a mobile communication device transitions from a first base station to a second base station based on a signal to noise ratio (SNR) associated with each base station. For example, if the SNR of the first base station is at least 7 dB less than the SNR of the second base station, the mobile communication device may roam or handoff to the second base station. The ODC system 2402 may take advantage of this roaming feature or handoff feature to induce a communication device to register with the ODC system 2402 for communications. To illustrate, the system 2400 may include targeted base stations 2404 and 2406 and the ODC system 2402 may acquire data associated with the targeted base stations 2404 and 2406 and data associated with a neighboring base station of the targeted base stations 2404 and 2406, such as the base station 2408. The neighboring base station 2408 is a neighboring base station of the targeted base stations 2404 and 2406 in an expected direction of travel of the ODC system 2402. The acquired base station data may include a broadcast channel of the respective base station and a list of neighboring base stations related to each respective base station. Further, the ODC system 2402 may generate a ban signal, such as a noise signal, in the channel used by the targeted base station(s) 2404 and 2406 and a communication signal mimicking the neighboring base station 2408. Thus, communication devices in the coverage region 2444 around the ODC system 2402 may perceive an increase in the SNR of the mimicked base station 2408 and a decrease in the SNR of the targeted base station(s) 2404 and 2406. As the difference in the SNRs grows larger, the communication devices may be induced to register with the ODC system 2402 according to their roaming feature and handoff properties.

In an illustrative, non-limiting embodiment, the ODC system 2402 may include multiple ODC units. For example, a first ODC unit may mimic a neighboring base station and a second ODC unit may broadcast duplicate information of the targeted base station. Thus, in the example depicted, a first ODC unit of the ODC system 2402 may be transmitting communication signals on channel 32, which is associated with the base station 2408, to mimic the base station 2408, and a second ODC unit of the ODC system 2402 may transmit communication signals, noise signals, or any combination thereof, on channel 30 and channel 31 to duplicate the targeted base stations 2404 and 2406.

Once a communication device is registered to communicate with the ODC system 2402, the ODC system 2402 may control communication signals sent to the captured communication device. For example, communications coming from the captured communication device may be routed to the ODC system 2402, which may forward the communications to the targeted or mimicked base station. Similarly, the ODC system 2402 may mimic signals of the captured communication device and communicate with a targeted base station as the captured communication device. To illustrate, communications directed to the captured communication device from the targeted or mimicked base station may be received by the ODC system 2402 and selectively forwarded to the captured communication device. In some embodiments, the ODC system 2402 may choose not to forward communications to the captured communication device and may cause a ring back to be sent to the communication device making the call.

Figure 25:
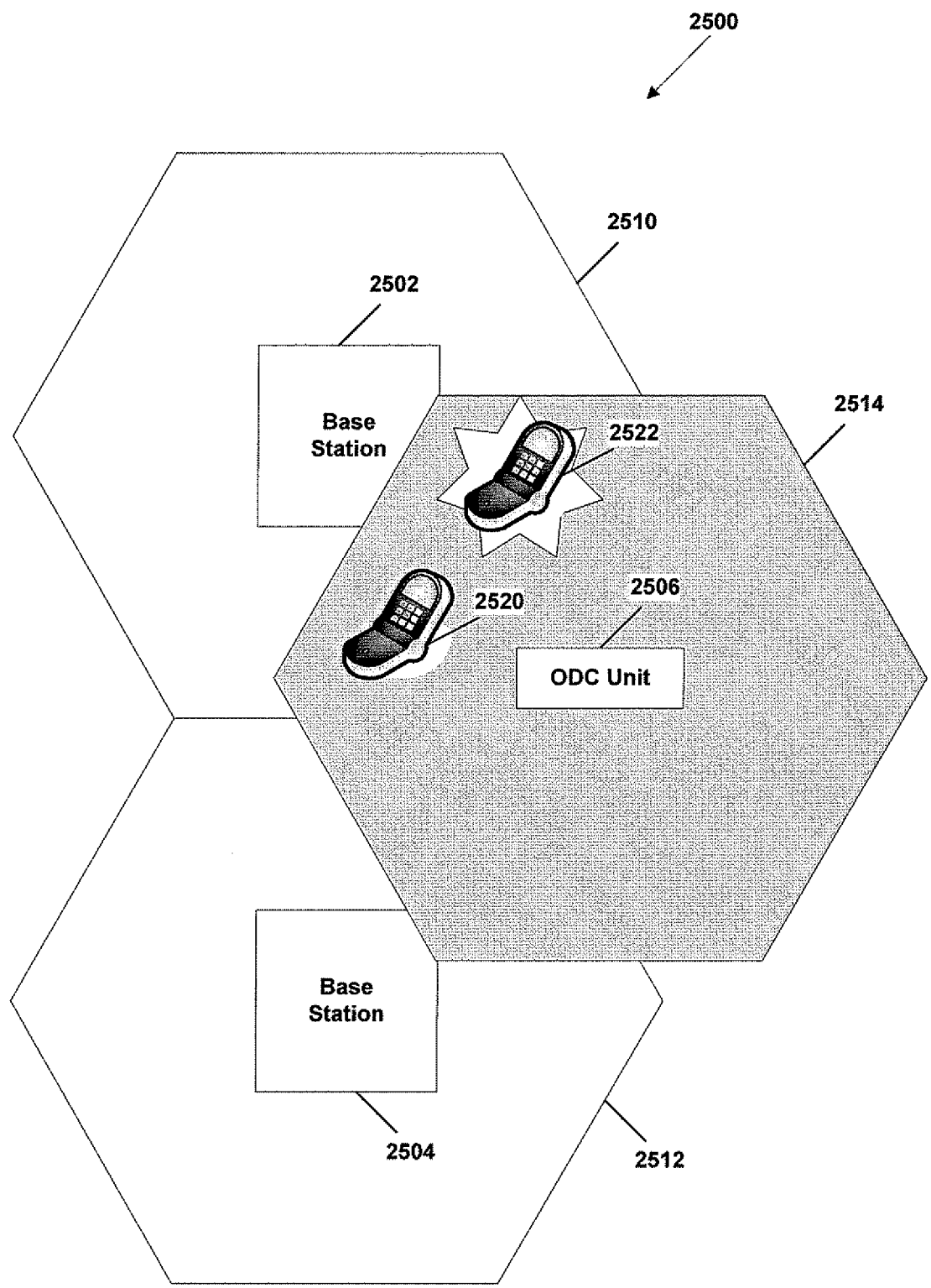
FIG. 25 depicts a second embodiment of a system to control wireless communications.

FIG. 25 depicts another particular embodiment of a system to control wireless communications. The system 2500 includes a base station 2502, a base station 2504, and an on-demand cellular (ODC) unit 2506. The base station 2502 controls wireless communications within a coverage region 2510, the base station 2504 controls wireless communications within a coverage region 2512, and the ODC unit 2506 controls wireless communications in a coverage region 2514.

In an illustrative embodiment, the ODC unit 2506 is configured for an improvised explosive device (IED) protection mission. For example, the ODC unit 2506 may include a passive mode and an active mode. In the passive mode, the ODC unit 2506 may induce mobile communication devices in the coverage area 2514, such as the mobile communication devices 2520 and 2522, to roam into coverage of the ODC unit 2506 by taking advantage of the roaming functionality of the mobile communication devices 2520, 2522. The mobile communication devices 2520 and 2522 may then be blocked from communicating with the commercial cellular network via the base stations 2502 and 2504. Thus, if the mobile communication device 2520 or 2522 is coupled to an IED as a triggering device, the ODC unit 2506 may block IED triggering signals from reaching the mobile communication device 2520 or the mobile communication device 2522.

In the active mode, the ODC unit 2506 induces mobile communication devices, such as the mobile communication devices 2520, 2522, to roam within control of the ODC unit 2506. The ODC unit 2506 then calls one or more of the mobile communication devices 2520, 2522 well in advance of a protected armed forces unit, such as a military vehicle or convoy, coming in proximity to the mobile communication device 2520, 2522. If one of the mobile communication devices 2520, 2522 is set up to trigger an IED, such as the mobile communications device 2522, the IED is thus detonated well before the protected unit is in danger. For example, the coverage area 2514 provided by the ODC unit 2506 may be from about 2 to 10 kilometers. In an illustrative, non-limiting embodiment, the ODC unit 2506 may call a mobile communication device that is set up to trigger an IED at a selected time based on a location of a protected unit, based on a direction of travel of the protected unit, based on the rate of travel of the protected unit, or any combination thereof.

Figure 26:
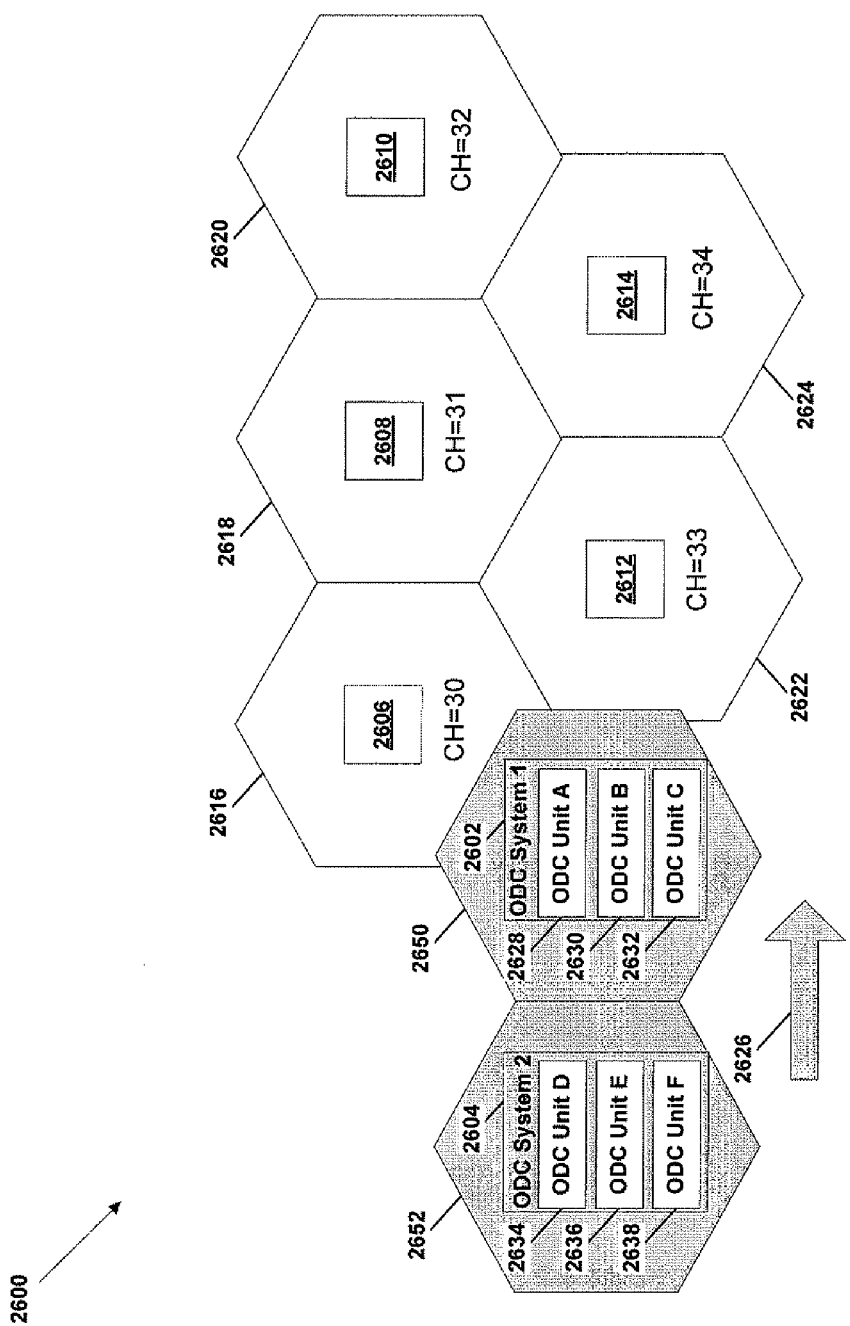
FIG. 26 depicts a third embodiment of a system to control wireless communications.

FIG. 26 depicts another embodiment of a system to control wireless communications. The system 2600 includes a first on-demand cellular (ODC) system 2602 and a second ODC system 2604. The first ODC system 2602 controls communications in a coverage area 2650, and the second ODC system 2604 controls communications in a coverage area 2652. The system 2600 also includes base stations 2606-2614. The base station 2606 controls communications in a coverage area 2616 and communicates via channel 30 and the base station 2608 controls communications in a coverage area 2618 and communicates via channel 31. Additionally, the base station 2610 controls communications in a coverage area 2620 and communicates via channel 32 and the base station 2612 controls communications in a coverage area 2622 and communicates via channel 33. Further, the base station 2614 controls communications in a coverage area 2624 and communicates via channel 34. The first ODC system 2602 includes an ODC Unit A 2628, an ODC Unit B 2630, and an ODC Unit C 2632. The second ODC system 2604 includes an ODC Unit D 2634, an ODC Unit E 2636, and an ODC Unit F 2638. The ODC systems 2602, 2604 may be moving in a direction of travel 2626.

In an illustrative embodiment, the first ODC system 2602 may serve as a working system that acquires information from targeted base stations and mimics communication signals of targeted base stations. The first ODC system 2602 may also identify one or more neighboring base stations based on the location of the first ODC system 2602, the direction of travel 2626 of the first ODC system 2602 and the second ODC system 2604, or any combination thereof. For example, the first ODC system 2602 may determine that the targeted base station 2606 communicates via the channel 30 and the targeted base station 2612 communicates via the channel 33. The first ODC system 2602 may also determine that the base stations 2608 and 2614 are neighboring base stations of the targeted base stations 2606 and 2612 and that the base station 2608 communicates via the channel 31 and that the base station 2614 communicates via the channel 34. Further, the first ODC system 2602 may determine that the base station 2610 is a neighboring base station of the base stations 2608 and 2614 and that the base station 2610 communicates via the channel 32.

The working system, such as the first ODC system 2602, may utilize the ODC Unit A 2628 to duplicate the broadcast channel of the targeted base station 2606 using the channel 30 and utilize the ODC Unit B 2630 to duplicate the broadcast channel of the targeted base station 2612 using the channel 33. The ODC Unit A 2628 may also send a noise signal using the channel 30 to decrease the signal to noise ratio with respect to the base station 2606 and communication devices in the coverage area 2650. Further, the ODC Unit B 2630 may send a noise signal using the channel 33 to decrease the signal to noise ratio with respect to the base station 2612 and communication devices in the coverage area 2650. Additionally, the first ODC system 2602 may utilize the ODC Unit C 2632 to mimic the communication signals of the neighboring base station 2608 using channel 31. Thus, communication devices in the coverage area 2650 may be induced to roam onto the first ODC system 2602, which is mimicking the neighboring base station 2608.

The second ODC system 2604 may serve as a prepare system that prepares for mimicking subsequent base stations. The prepare system, such as the second ODC system 2604, may acquire the channel broadcast information and neighboring base station information from the base stations 2608, 2610, and 2614 and may prepare to transition to the first neighboring unit, that is the base station 2608, as a first targeted unit and prepare to transition to the second neighboring unit, that is the base station 2614, as a second targeted unit. For example, the ODC Unit D 2634 of the second ODC system 2604 may duplicate the broadcast channel of the base station 2608 using the channel 31 and the ODC Unit E 2636 of the second ODC system 2604 may duplicate the broadcast channel of the base station 2614 using the channel 34. Further, the ODC Unit F 2638 of the second ODC system 2604 may mimic the communication signals of the base station 2610, which is a neighboring base station of the base stations 2608 and 2614, using channel 32.

Figure 27:
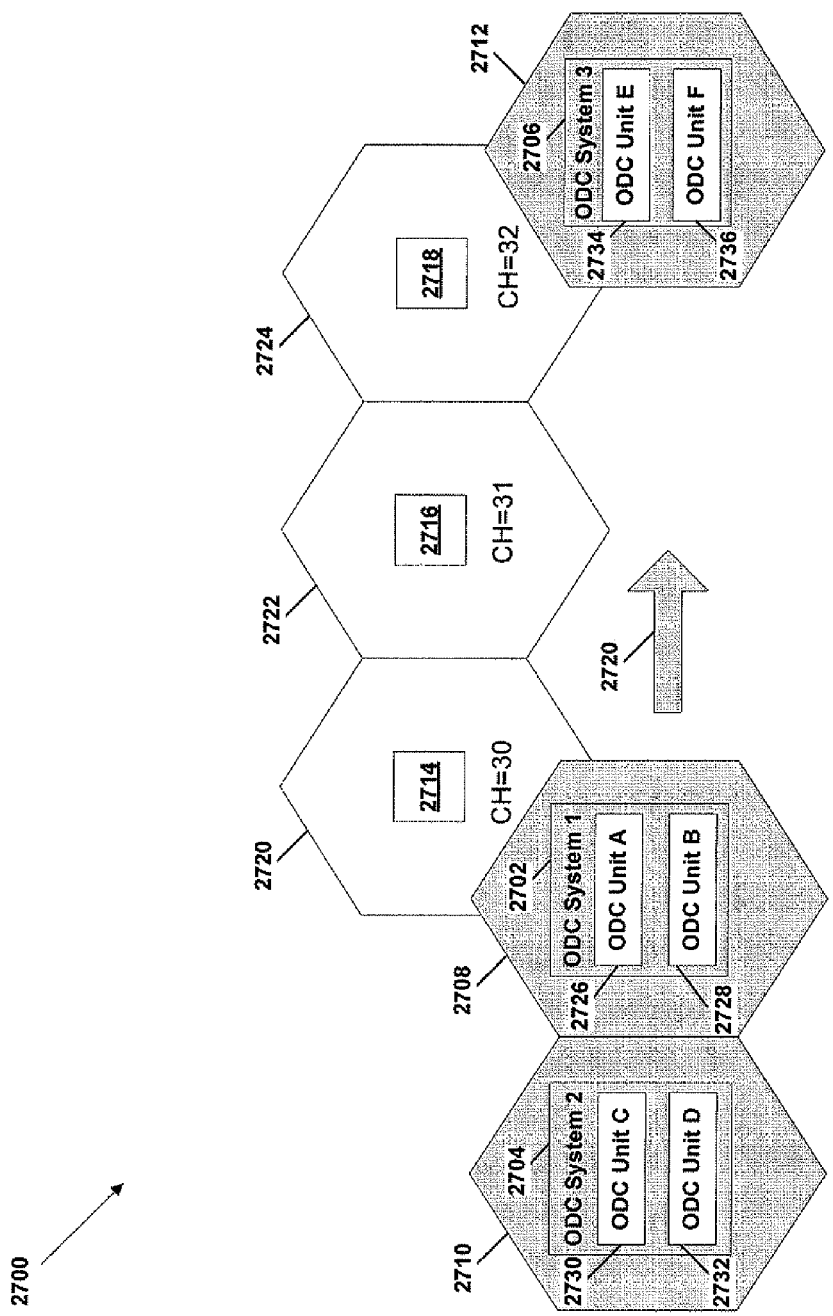
FIG. 27 depicts a fourth embodiment of a system to control wireless communications.

FIG. 27 depicts another embodiment of a system to control wireless communications. The system 2700 includes a first on-demand cellular (ODC) system 2702, a second ODC system 2704, and a third ODC system 2706. The first ODC system 2702 controls communications in a coverage area 2708, the second ODC system 2704 controls communications in a coverage area 2710, and the third ODC system 2706 controls communications in a coverage area 2712. The system 2700 also includes base stations 2714-2718. The base station 2714 controls communications in a coverage area 2720 and communicates via channel 30, and the base station 2716 controls communications in a coverage area 2722 and communicates via channel 31. Additionally, the base station 2718 controls communications in a coverage area 2724 and communicates via channel 32. The first ODC system 2702 includes an ODC Unit A 2726 and an ODC Unit B 2728 and the second ODC system 2704 includes an ODC Unit C 2730 and an ODC Unit D 2732. Further, the third ODC system 2706 includes an ODC Unit E 2734 and an ODC Unit F 2736. The ODC systems 2702 and 2704 may be moving in a direction of travel 2720.

In an illustrative embodiment, the first ODC system 2702 may serve as a working system that acquires information from targeted base stations and mimics communication signals of the targeted base stations. The first ODC system 2702 may also identify one or more neighboring base stations based on the location of the first ODC system 2702, the direction of travel 2720 of the first ODC system 2702 and the second ODC system 2704, or any combination thereof. Additionally, the first ODC system 2702 may determine that the targeted base station 2714 communicates via the channel 30 and that the base station 2716 is a neighboring base station of the base station 2714. Further, the first ODC system 2702 may determine that the base station 2718 is a neighboring base station of the base station 2716 and that the base station 2718 communicates via the channel 32.

The second ODC system 2704 may serve as a prepare system that prepares for mimicking subsequent base stations. The second ODC system 2704 may acquire the channel broadcast information and neighboring base station information from the base stations 2716 and 2718. The third ODC system 2706 may predict subsequent base stations related to the base stations 2714-2718. For example, the third ODC system 2712 may identify neighboring base stations with respect to the base stations 2716 and 2718. In an illustrative, non-limiting embodiment, the third ODC system 2706 may be included in a vehicle, such as a helicopter, tank, or airplane.

The working system, that is the first ODC system 2702, may utilize the ODC unit A 2726 to duplicate the broadcast channel of the targeted base station 2714 using the channel 30 and may utilize the ODC unit B 2728 to mimic the communication signals of the neighboring base station 2716 using the channel 31. The ODC unit A 2726 may also send a noise signal using the channel 30 to decrease the signal to noise ratio with respect to the base station 2714 and communication devices in the coverage area 2708. Thus, communication devices in the coverage area 2708 may be induced to roam onto the first ODC system 2702, which is mimicking the neighboring base station 2716.

The prepare system, the second ODC system 2704, may prepare to transition to the first neighboring unit, the base station 2716, as a first targeted unit. For example, the ODC unit C 2730 of the second ODC system 2704 may duplicate the broadcast channel of the base station 2716 using the channel 31. Further, the ODC unit D 2732 of the second ODC system 2704 may mimic the communication signals of the base station 2718, which is a neighboring base station of the base station 2716. The ODC Unit E 2734 and the ODC Unit F 2736 of the third ODC system 2706 may be used to duplicate and/or mimic signals of neighboring base stations of the base station 2718.

Figure 28:
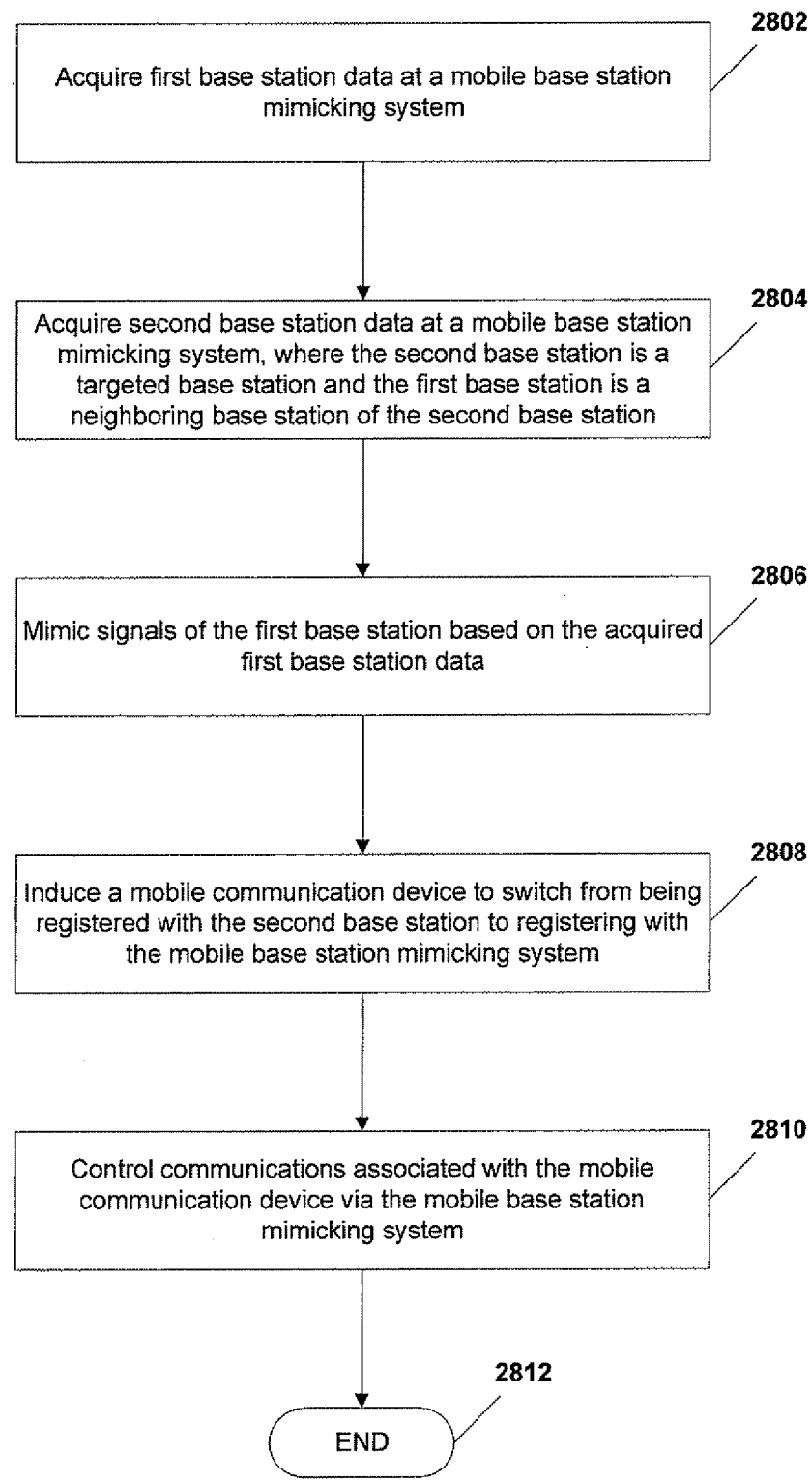
FIG. 28 is a flow diagram of a particular embodiment of a method of controlling wireless communications.

FIG. 28 is a flow diagram of an embodiment of a method to control wireless communications. At 2802, a mobile base station mimicking system, such as an on-demand cellular (ODC) system, acquires first base station data from a first base station. For example, the mobile base station mimicking system may acquire a channel utilized by the first base station to communicate and a list of neighboring base stations associated with the first base station. Moving to 2804, the mobile base station mimicking system acquires second base station data from a second base station. For example, the mobile base station mimicking system may acquire a channel utilized by the second base station to communicate and a list of neighboring base stations associated with the second base station. The second base station may be a targeted base station and the first base station may be a neighboring base station of the second base station. Further, the data acquired from the first base station and the second base station may be associated with one or more commercial networks that include the first base station and the second base station.

Proceeding to 2806, the mobile base station mimicking system mimics signals of the first base station based on the acquired first base station data. For example, the mobile base station mimicking system may mimic identification signals related to the first base station that are transmitted by the first base station to communication devices within a coverage area served by the first base station. At 2808, the mobile base station mimicking system induces a mobile communication device to switch from being registered with the second base station to register with the mobile base station mimicking system. For example, the mobile base station mimicking system may transmit a noise signal on a channel used by the second base station to decrease a signal to noise ratio with respect to the second base station and the mobile communication device. When the signal to noise ratio reaches a specified threshold, the mobile communication device may attempt to register with another base station. Since, the mobile base station mimicking system is transmitting duplicate signals of neighboring base stations of the second base station, such as the first base station, the mobile base station mimicking system can capture a registration request from the mobile communication device and register the mobile communication device with the mobile base station mimicking system. The handoff to the mobile base station mimicking system is transparent to the mobile communication device user. For example, the call bars, the logo of the wireless carrier associated with the mobile communication device, identification information of the wireless carrier, or any combination thereof may still be presented via the mobile communication device. Further, the mobile communication device may be in an active call mode, such as during a phone call, when the mobile communication device registers with the mobile base station mimicking system or the mobile communication device may be turned on, but not in use.

Moving to 2810, the mobile base station mimicking system controls communications associated with the mobile communication device. For example, the mobile base station mimicking system may switch calls to and from the mobile communication device and operate in a similar manner to a commercial wireless network base station. The mobile base station mimicking system may also block signals from being sent to the mobile communication device. To illustrate, the mobile communication device may serve as a triggering device for an improvised explosive device (IED), and the mobile base station mimicking system may block a triggering signal from being sent to the mobile communication device. The mobile base station mimicking system may also send a triggering signal to the mobile communication device to set off the IED associated with the mobile communication device when an armed forces unit or civilians are not in danger of being affected by the detonation. Further, the mobile base station mimicking system may mimic the mobile communication device and receive communication data that is directed to the mobile communication device from base stations of a commercial wireless network. The communication data received from the wireless network base stations may or may not be forwarded to the mobile communication device. The mobile base station mimicking system may also send a communication notification to the mobile communication device. The method terminates at 2812.

With the configuration of structure described above, the present disclosure provides a system and method of controlling communications through use of a flexible telecommunications device, i.e., the DMA server 406 (FIG. 4), that is distributive and associative, i.e., it can operate stand-alone or seamlessly within an existing cellular or other network. Moreover, the DMA server 406 can be integrated with virtually any third party base station. The DMA server 406 can operate with multiple air interfaces including CDMA IS-95, CDMA 1X, CDMA EVDO, GSM, GPRS, W-CDMA, 802.11 (Wi-fi), 802.16 (Wi-fi), etc. Further, the DMA server 406 can provide integrated prepaid billing, OAMP, network management, and AAA functionality. The DMA server 406 can include a Java based user interface and feature configuration system. Also, the DMA server 406 can provide real time call metering, call detail record (CDR) generation, and real time call provisioning. The DMA server 406 may be implemented in a relatively small footprint and has a relatively low power requirement. Further, the DMA server 406 may be implemented using inexpensive and widely available computer equipment.

With one or more of the deployment configurations described above, the present system provides mobile to landline calls from mobile handsets within a DMA server cellular coverage area. Also, mobile to landline calls can be made from mobile handsets roaming into DMA coverage areas. Mobile to mobile calls can be made from home/roaming handsets to DMA handsets and vice versa. Further, mobile to IP calls and IP to mobile calls can be made from within a DMA server coverage area. IP to IP calls can be made from any DMA handset to any IP phone. Additionally, IP to land-line calls and landline to IP calls can be made from a DMA handset to any phone. Further, land-line to mobile calls to DMA handsets can be made.

The systems described above can support call forwarding, call waiting, 3-way calling caller ID, voice mail, and mobile to mobile SMS service, i.e., text messaging. Further, the systems described above can provide broadcast SMS service, mobile to land high-speed IP data (1× or GPRS) service and mobile-to-mobile high speed IP data (1× or GPRS) service. Also, the systems described above can provide IP-PBX capability.

Further, one or more of the illustrated systems can provide IP transport between distributed elements, e.g., DMA servers 406 (FIG. 4). Packet back-haul from BTS to RAN can be provided. Further, the control logic within the DMA servers 406 (FIG. 4) can be distributed and associated. Associated systems can be redundant, self-healing, self-organizing, and scalable. Distributed systems can be "snap-together," i.e., a DMA server 406 (FIG. 4) can be linked to a previously deployed DMA server 406 (FIG. 4) in order to broaden, or otherwise extend, cellular coverage. Further, distributed systems can be de-centralized to avoid single points of failure.

One or more of the systems described above can also provide soft and softer call handoffs on the same frequency interfaces. Also, soft handoffs can be provided on different systems. Further, a DMA based system can operate stand-alone with a billing system provided by a DMA server and CDR generation. Or, a system can use the SS7 network to pass CDRs to a central switch for integrated billing and operation with an existing network.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. A method of controlling wireless communications, the method comprising:
  acquiring first base station data at a mobile base station mimicking system, the first base station data associated with a first base station of a wireless communication system;

sending signals that mimic the first base station via the mobile base station mimicking system based on the acquired first base station data;

registering at least one communication device with the mobile base station mimicking system in response to receiving a registration request from the at least one communication device at the mobile base station mimicking system; and selectively routing communications associated with the at least one communication device via the mobile base station mimicking system, wherein selectively routing the communications comprises forwarding a first communication associated with the at least one communication device and blocking a second communication associated with the at least one communication device.

2. The method of claim 1, wherein the first communication is a call signal, and wherein the first communication is forwarded from the mobile base station mimicking system to a particular communication device of the at least one communication device that is registered with the mobile base station mimicking system.

3. The method of claim 1, wherein selectively routing the communications further comprises routing the communications to a third party to allow the third party to monitor the communications.

4. The method of claim 1, wherein the wireless communication system includes a Global System for Mobile Communication (GSM) system, a Code Division Multiple Access (CDMA) system, a Wideband Code Division Multiple Access (WCDMA), a Long Term Evolution (LTE), or any combination thereof.

5. The method of claim 1, wherein the mobile base station mimicking system includes a distributed mobile architecture server.

6. The method of claim 1, wherein the mobile base station mimicking system transmits the acquired first base station data associated with the first base station to the at least one communication device.

7. The method of claim 1, further comprising acquiring second base station data at the mobile base station mimicking system, wherein the second base station data is associated with a second base station.

8. The method of claim 7, wherein the at least one communication device is registered with the second base station prior to registering with the mobile base station mimicking system.

9. The method of claim 8, further comprising:
receiving the second communication at the mobile base station mimicking system from at least one of the first base station and the second base station, wherein the second communication is a call directed to the at least one communication device; and
blocking transmission of the second communication to the at least one communication device.

10. The method of claim 8, further comprising:
receiving the first communication at the mobile base station mimicking system from the at least one communication device, wherein the first communication is associated with a call; and
routing the first communication from the mobile base station mimicking system to at least one of the first base station and the second base station.

11. The method of claim 7, further comprising sending a noise signal to the at least one communication device to decrease a signal to noise ratio associated with the second base station with respect to the at least one communication device to induce the at least one communication device to send the registration request to the mobile base station mimicking system.

12. The method of claim 7, further comprising:
acquiring communication device data associated with the at least one communication device at the mobile base station mimicking system; and
mimicking, based on the acquired communication device data, the at least one communication device during communications between the mobile base station mimicking system and the first base station, the second base station, or any combination thereof.

13. The method of claim 7, wherein the second base station is a targeted base station and wherein the first base station is a neighboring base station with respect to the second base station in an expected direction of travel of the mobile base station mimicking system.

14. A method of controlling wireless communications, the method comprising:
inducing a mobile communication device that is registered with a target base station to send a request to register with an on-demand cellular system by sending a noise signal on a channel associated with the target base station, wherein the mobile communication device functions as a triggering mechanism of a particular remotely controlled explosive device;
registering the mobile communication device with the on-demand cellular system based on the request; and
after registering the mobile communication device, selectively routing communications associated with the mobile communication device via the on-demand cellular system.

15. The method of claim 14, further comprising sending a signal from the on-demand cellular system to the mobile communication device at a selected time.

16. The method of claim 15, wherein the signal comprises a detonation triggering signal.

17. The method of claim 16, wherein the selected time is based on a proximity of a protected unit to the mobile communication device, a direction of travel of the protected unit, a rate of travel of the protected unit, or any combination thereof.

18. The method of claim 14, wherein inducing the mobile communication device to register with the on-demand cellular system comprises mimicking a second base station, and wherein the mobile communication device is registered with the target base station before registering with the on-demand cellular system.

19. The method of claim 14, wherein the communications associated with the mobile communication device include one or more short messaging service (SMS) messages.

20. The method of claim 14, wherein selectively routing the communications associated with the mobile communication device via the on-demand cellular system includes blocking the communications, forwarding the communications, or any combination thereof.

21. A system, comprising:
a mobile base station mimicking system adapted to:
create a movable communication control region that advances as the system advances;
send noise signals on a channel used by a targeted base station to induce at least one communication device within a control region established by the targeted base station to communicate via the mobile base station mimicking system when the movable communication control region advances to include the at least one communication device;

receive, from the targeted base station, one or more communications that are directed to the at least one communication device; and selectively forward the one or more communications to the at least one communication device.

22. The system of claim 21, wherein the mobile base station mimicking system includes:

a first unit adapted to send the noise signals to the at least one communication device, wherein the noise signals are sent on a first channel used by the targeted base station to communicate; and a second unit adapted to transmit mimicking signals to the at least one communication device, wherein the mimicking signals are adapted to mimic communication signals sent from a neighboring base station of the targeted base station to the at least one communication device, and wherein the mimicking signals are sent on a second channel used by the neighboring base station to communicate, wherein the at least one communication device is induced to communicate with the mobile base station mimicking system when a signal to noise ratio between the at least one communication device and the targeted base station falls below a threshold, and wherein the threshold is based on a roaming feature associated with the at least one communication device, a handoff feature associated with the at least one communication device, or any combination thereof.

23. The system of claim 21, wherein the mobile base station mimicking system is adapted to monitor the one or more communications that are directed to the at least one communication device.

24. The system of claim 21, wherein the mobile base station mimicking system is adapted to monitor a position of the at least one communication device.

25. The system of claim 21, wherein the mobile base station mimicking system is adapted to block a subset of the one or more communications received at the mobile base station mimicking system that are directed to the at least one communication device.

* * * * *